United States Patent
Sugita et al.

(10) Patent No.: US 10,641,983 B2
(45) Date of Patent: May 5, 2020

(54) LENS APPARATUS AND AN IMAGE PICKUP APPARATUS INCLUDING SAME

(71) Applicant: CANON KABUSHIKI KAISHA, Tokyo (JP)

(72) Inventors: Shigenobu Sugita, Shimotsuke (JP); Yuki Nagao, Utsunomiya (JP); Suguru Inoue, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 63 days.

(21) Appl. No.: 15/609,688

(22) Filed: May 31, 2017

(65) Prior Publication Data

US 2017/0351050 A1 Dec. 7, 2017

(30) Foreign Application Priority Data

Jun. 1, 2016 (JP) .................. 2016-109654

(51) Int. Cl.
| | | |
|---|---|---|
| *G02B 7/02* | (2006.01) | |
| *G02B 7/04* | (2006.01) | |
| *G02B 27/00* | (2006.01) | |
| *G02B 7/00* | (2006.01) | |
| *G02B 9/64* | (2006.01) | |

(52) U.S. Cl.
CPC .............. *G02B 7/04* (2013.01); *G02B 7/008* (2013.01); *G02B 9/64* (2013.01); *G02B 27/0025* (2013.01)

(58) Field of Classification Search
CPC ........................................................ G02B 7/04
USPC ........................................................ 359/618
See application file for complete search history.

(56) References Cited

U.S. PATENT DOCUMENTS

| | | | |
|---|---|---|---|
| 2003/0137746 A1* | 7/2003 | Kitaoka | G02B 7/028 |
| | | | 359/687 |
| 2010/0104272 A1 | 4/2010 | Ogino et al. | |
| 2018/0307000 A1* | 10/2018 | Lai | G02B 7/028 |

FOREIGN PATENT DOCUMENTS

| | | |
|---|---|---|
| JP | H06-186466 A | 7/1994 |
| JP | 2012-255911 A | 12/2012 |
| JP | 2014-056196 A | 3/2014 |
| JP | 2015-215437 A | 12/2015 |

* cited by examiner

*Primary Examiner* — James C. Jones
(74) *Attorney, Agent, or Firm* — Canon U.S.A., Inc., IP Division

(57) ABSTRACT

A lens apparatus that includes an optical system including a positive lens, the lens apparatus including a holding member arranged to hold the positive lens, an exterior member arranged to accommodate the holding member, and an engaging mechanism arranged to engage the holding member and the exterior member to each other.

17 Claims, 14 Drawing Sheets

LENS APPARATUS AND AN IMAGE PICKUP APPARATUS INCLUDING SAME

BACKGROUND OF THE INVENTION

Field of the Invention

The present disclosure relates to a lens holding mechanism of a lens apparatus and an image pickup apparatus including the lens apparatus.

Description of the Related Art

Lens apparatuses including an interchangeable lens used in a digital still camera are used under various environments. For example, in a case in which the lens apparatus is used in a high-temperature environment, temperatures of the lenses included in the lens apparatus may increase, and the optical characteristics of the lenses may be changed.

Japanese Patent Laid-Open No. 2012-255911 discloses an optical apparatus adopting a configuration in which a heat insulating member is disposed between a light source and a lens unit so that heat from the light source is not easily conducted to a lens barrel.

In the optical apparatus of Japanese Patent Laid-Open No. 2012-255911, the heat insulating member separate to the lens barrel is disposed in order to reduce the thermal expansion of the lens barrel. Therefore, problems such as increase in size and cost tend to occur. Furthermore, in Japanese Patent Laid-Open No. 2012-255911, no consideration has been made of the change in temperature of a specific lens. Each of the embodiments of the present invention described below can be implemented solely or as a combination of a plurality of the embodiments or features thereof where necessary or where the combination of elements or features from individual embodiments in a single embodiment is beneficial.

SUMMARY OF THE INVENTION

The present disclosure provides a lens apparatus and an image pickup apparatus in which change in optical performance upon change in the ambient temperature is reduced.

A lens apparatus of the present disclosure includes an optical system including a positive lens Gp. The lens apparatus includes a holding member arranged to hold the positive lens Gp, and an exterior member arranged to engage with the holding member and to accommodate the holding member. In the lens apparatus, the temperature coefficient of a refractive index of the material of the positive lens Gp has a negative value, and assuming that a first plane is a plane that passes through a point on the object side surface of the positive lens Gp, positioned closest to an object, and that the first plane is perpendicular to the optical axis of the optical system, and a second plane is a plane that passes through a point on the image side surface of the positive lens Gp, positioned closest to an image, and that the second plane is perpendicular to the optical axis of the optical system, the holding member and the exterior member are disposed so as to be separated from each other with an air gap therebetween in a region between the first plane and the second plane.

Furthermore, a lens apparatus of the present disclosure includes an optical system including a positive lens Gp. The lens apparatus includes a holding member arranged to hold the positive lens Gp, and an exterior member arranged to engage with the holding member and to accommodate the holding member. In the lens apparatus, a conditional expression $80.0 < vdp$ is satisfied, where $vdp$ is an Abbe constant of the material of the positive lens Gp, and assuming that a first plane is a plane that passes through a point on the object side surface of the positive lens Gp, positioned closest to an object, and that the first plane is perpendicular to the optical axis of the optical system, and a second plane is a plane that passes through a point on the image side surface of the positive lens Gp, positioned closest to an image, and that the second plane is perpendicular to the optical axis of the optical system, the holding member and the exterior member are disposed so as to be separated from each other with an air gap in between in a region between the first plane and the second plane.

Further features of the present invention will become apparent from the following description of exemplary embodiments with reference to the attached drawings.

DESCRIPTION OF THE EMBODIMENTS

Hereinafter, embodiments of a lens apparatus and an image pickup apparatus including the lens apparatus of the present disclosure will be described in detail with reference to the accompanying drawings. The lens apparatus of the present exemplary embodiment includes an optical system, a holding member that holds the optical system, and an exterior member that protects the holding member from external impact and the like and that accommodates the holding member therein. The optical system is held by the holding member and a holding mechanism that includes the exterior member. The exterior member is engaged to the holding member. In order to reduce change in the optical performance of the optical system caused by change in temperature of a specific lens, an air gap is provided between the exterior member and the holding member in the region where the specific lens is held.

Figure 1:
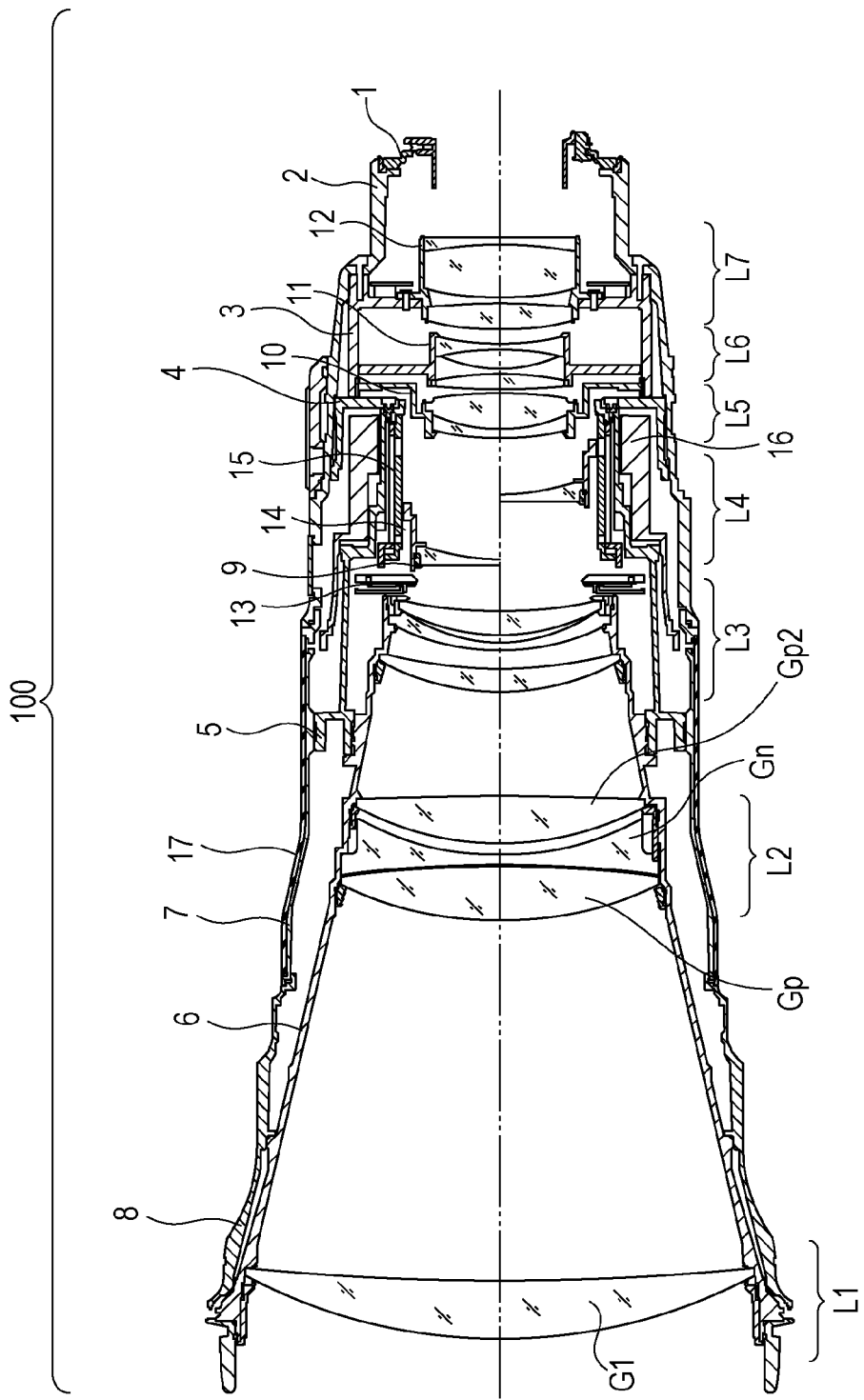
FIG. 1 is a cross-sectional view illustrating a holding mechanism of an optical system.

FIG. 1 is a cross-sectional view of a lens apparatus 100 including an image pickup optical system including a plurality of lenses, and a holding mechanism that holds the image pickup optical system. A first lens unit L1 to a seventh lens unit L7 are included in the image pickup optical system, and each lens unit is held by a lens holding barrel described later serving as a holding member.

The lens apparatus 100 can be mounted on a camera main body (not shown), and the lens apparatus 100 is mounted on the camera main body through a mount 1. The mount 1 is fitted to a first exterior barrel 2, and the first exterior barrel 2 is radially fitted to an inner fixed barrel 3. The inner fixed barrel 3 is used to fix a first lens holding barrel 10, a second lens holding barrel 11, and a third lens holding barrel 12. The first lens holding barrel 10 holds the fifth lens unit L5, the second lens holding barrel 11 holds the sixth lens unit L6, and the third lens holding barrel 12 holds the seventh lens unit L7.

An intermediate barrel 4 is disposed between the inner fixed barrel 3 and a connection barrel 5, and is radially fitted to each of the inner fixed barrel 3 and the connection barrel 5. The connection barrel 5 is screwed onto and engaged to a fourth lens holding barrel 6. The mechanism of engaging the connection barrel 5 and the fourth lens holding barrel 6 will be described in detail later. A second exterior barrel 8 and a third exterior barrel 7 are members that accommodate the fourth lens holding barrel 6, and the second exterior barrel 8 is screwed onto and engaged to the fourth lens holding barrel 6. The third exterior barrel 7 and the fourth lens holding barrel 6 are engaged to each other through the connection barrel 5. Note that in the lens apparatus illustrated in FIG. 1, while the second exterior barrel 8 and the third exterior barrel 7 are separate members, the second exterior barrel 8 and the third exterior barrel 7 may be formed in an integral manner as a single exterior barrel.

The third exterior barrel 7 functions as a focus ring, and the third exterior barrel 7 is connected to a focus actuator 16 with a connection mechanism (not shown). Upon rotational operation of the focus ring serving as the third exterior barrel 7, the focus actuator 16 is driven.

The fourth lens holding barrel 6 holds the first lens unit L1, the second lens unit L2, and the third lens unit L3. A lens G1 constituting the first lens unit L1, and a positive lens Gp, a negative lens Gn, and a positive lens Gp2 that are included in the second lens unit L2 are held by the fourth lens holding barrel 6.

A fifth lens holding barrel 9 holds a fourth lens unit L4 serving as a focusing unit, and is held by a cam barrel 14 and a guide barrel 15. Upon rotation of the cam barrel 14, the fifth lens holding barrel 9 is driven in an optical axis direction along a shape of a cam groove provided in the cam barrel 14. An aperture unit 13 that adjusts the amount of light of the image pickup optical system is held by the connection barrel 5.

Figure 2:
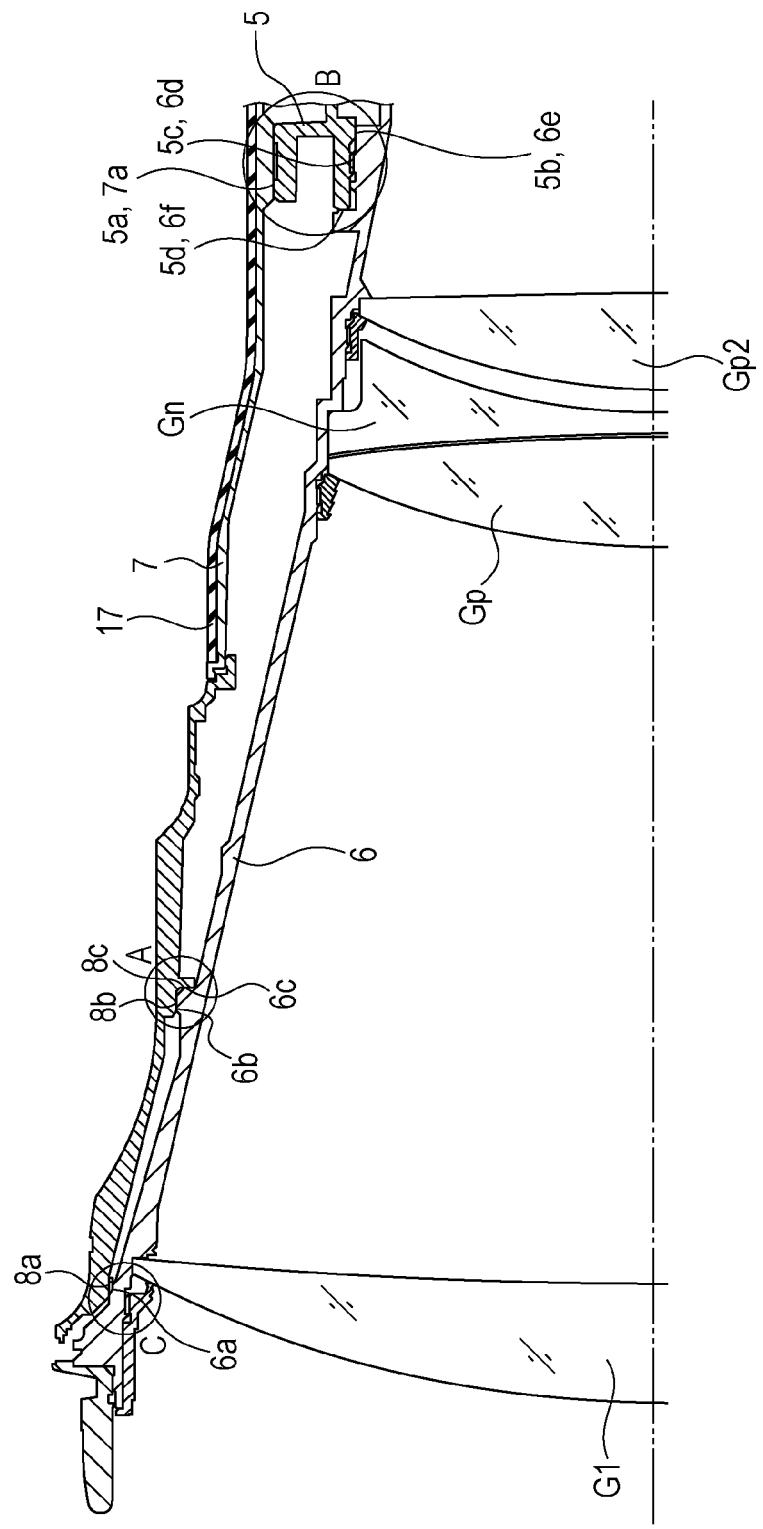
FIG. 2 is a diagram in which a portion of the cross-sectional view illustrated in FIG. 1 has been enlarged.

FIG. 2 is an enlarged view of the cross-sectional view illustrated in FIG. 1. Referring to FIG. 2, an engaging mechanism of the connection barrel 5, the fourth lens holding barrel 6, and the third exterior barrel 7, and an engaging mechanism of the fourth lens holding barrel 6 and the second exterior barrel 8 will be described. The connection barrel 5 includes an outer fitting portion 5a, an inner fitting portion 5b, an internal-thread 5c, and an abutment portion 5d. The fourth lens holding barrel 6 includes an external-thread 6a that is screwed into and engaged to the second exterior barrel 8, an outer fitting portion 6b, an abutment portion 6c, an external-thread 6d that is screwed into and connected to the connection barrel 5, an outer fitting portion 6e, and an abutment portion 6f. The third exterior barrel 7 includes an inner fitting portion 7a.

The second exterior barrel 8 includes an internal-thread 8a that is used to screw into and engage with the fourth lens holding barrel 6, an inner fitting portion 8b, and an abutment portion 8c. The positional relationship between the connection barrel 5 and the fourth lens holding barrel 6 is defined by fitting the inner fitting portion 5b and the outer fitting portion 6e to each other, screwing and engaging the external-thread 6d and the internal-thread 5c to each other, and having the abutment portion 6f and the abutment portion 5d be in contact with each other. By fitting the outer fitting portion 5a and the inner fitting portion 7a to each other, the connection barrel 5 and the third exterior barrel 7 are fitted to each other. Furthermore, a rubber member 17 that protects the focus ring, serving as the third exterior barrel 7, is attached on a surface of the focus ring. Note that the rubber member 17 is not essential and the rubber member 17 may not be attached on the surface of the third exterior barrel 7.

The positional relationship between the fourth lens holding barrel 6 and the second exterior barrel 8 is defined by fitting the inner fitting portion 8b and the outer fitting portion 6b to each other, screwing and engaging the external-thread 6a and the internal-thread 8a to each other, and having the abutment portion 6c and the abutment portion 8c be in contact with each other.

The fourth lens holding barrel 6 is in contact with the exterior barrel 8 or the third exterior barrel 7 in a contact region A, a contact region B, and a contact region C. In the contact region A, as described above, the inner fitting portion 8b and the outer fitting portion 6b are fitted to each other, and the abutment portion 6c and the abutment portion 8c are abutted against each other. In the contact region B, the fourth lens holding barrel 6 and the third exterior barrel 7 are in contact with each other through the connection barrel 5. In the contact region C, the external-thread 6a and the internal-thread 8a are screwed and engaged to each other.

In the present specification, "contact" refers to not only a case in which two members abut against each other but also a case in which two members are engaged to each other through another member. In a case in which two members are disposed so as to be separated with an air gap in between, the two members are deemed not in contact with each other. In a case in which two members are in contact with each other, the conduction of heat from one member to the other member is facilitated. Heat conduction between two members can be greatly reduced by providing an air gap between the two members.

Change in the optical characteristic of the lens caused by change in temperature will be described next. Assuming that n is refractive index, and T is temperature, temperature coefficient τ of the refractive index is expressed by $\tau = dn/dT$. In the present exemplary embodiment, a temperature coefficient τ based on the refractive index when the temperature is 25 degrees will be described.

Many materials used in lenses have a positive value of the temperature coefficient τ. In other words, as the temperature becomes higher, the refractive index becomes higher. However, some materials with low dispersion are known to have a negative value in the temperature coefficient τ. In other words, as the temperature becomes higher, the refractive index becomes lower. Furthermore, in materials in which toe temperature coefficient τ is negative, typically, the absolute value of the temperature coefficient is large such that the amount of change in the refractive index upon change in temperature is large. In an optical system in which a plurality of lens is disposed, changes of the optical characteristics of the lenses with respect to change in temperature need to be considered in a comprehensive manner.

For example, in a case of a super-telephoto lens, in order to favorably correct chromatic aberration, typically, positive lenses formed of a material with low dispersion and negative lenses formed of a material with high dispersion are disposed in a lens unit having a positive refractive power. In such a case, a material in which the temperature coefficient τ is negative is used as the material of the positive lens, and a material in which the temperature coefficient τ is positive is used as the material of the negative lens.

Typically, in a case in which a material in which the temperature coefficient τ is positive is used as the material of the positive lens and the negative lens, the spherical aberration generated by the positive lens and the spherical aberration generated by the negative lens cancel out each other. However, when a material in which the temperature coefficient τ is negative is used as the material of the positive lens, the amount of spherical aberration generated in the positive lens upon change in temperature and the amount of spherical aberration generated in the negative lens are added together and a large spherical aberration is generated easily.

Figure 3:
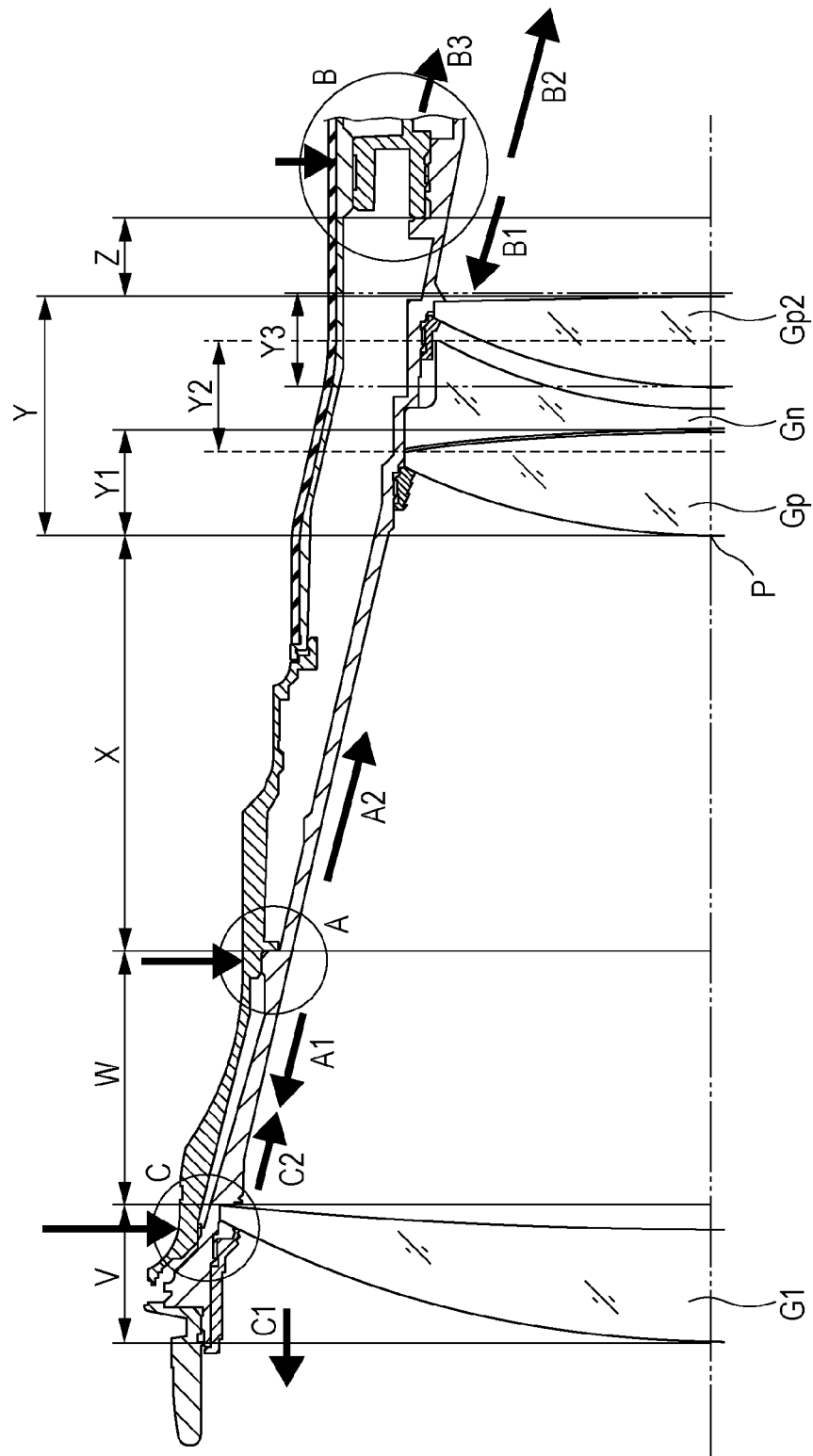
FIG. 3 is a schematic view illustrating heat transfer paths in the lens apparatus.

Accordingly, the lens apparatus of the present exemplary embodiment is configured such that the change in temperature of the positive lens Gp, which is formed with a material with low dispersion in which the temperature coefficient τ is negative, is reduced. Referring to FIG. 3, a configuration reducing the change in temperature of the positive lens Gp will be described. An optical reason for using a material with low dispersion as the material of the positive lens Gp will be described later.

FIG. 3 is an enlarged view illustrating the mechanism engaging the lens holding barrel and the exterior barrel to each other. A region V in FIG. 3 is a region in the optical axis direction where the first lens unit L1 is disposed. A region W is a region in the optical axis direction between the first lens unit L1 and the contact region A, and a region X is a region in the optical axis direction between the contact region A and the lens surface of second lens unit L2 that is closest to the object. A region Y is a region in the optical axis direction where the second lens unit L2 is disposed. A region Z is a region in the optical axis direction between the lens surface of the second lens unit L2 closest to the image and the contact region B.

Specifically, the region W is a region in the optical axis direction between a plane that is perpendicular to the optical axis and that passes through a point that is positioned closest to the image and on the lens surface of the first lens unit L1 that is closest to the image, and a plane that is perpendicular to the optical axis and that passes through a point, among the contact points in the contact region A, that is positioned closest to the image. The region X is a region in the optical axis direction between a plane that is perpendicular to the optical axis and that passes through, among the contact points in the contact region A, a point positioned closest to the image, and a plane that is perpendicular to the optical axis and that passes through an intersection P between the lens surface of the positive lens Gp on the object side and the optical axis.

The region Y is a region in the optical axis direction between a plane that is perpendicular to the optical axis and that passes through a point that is positioned closest to the object and on the lens surface of the second lens unit L2 that is closest to the object, and a plane that is perpendicular to the optical axis and that passes through a point that is positioned closest to the image and on the lens surface of the second lens unit L2 that is closest to the image. The region Z is a region in the optical axis direction between a plane that is perpendicular to the optical axis and that passes through a point that is positioned closest to the image and on the lens surface of the second lens unit L2 that is closest to the image, and a plane that is perpendicular to the optical axis and that passes through a point, among the contact points in the contact region B, that is positioned closest to the object.

A region Y1 is a region in the optical axis direction between a plane (a first plane) that is perpendicular to the optical axis and that passes through a point that is positioned closest to the object and on the lens surface of the positive lens Gp on the object side, and a plane (a second plane) that is perpendicular to the optical axis and that passes through a point that is positioned closest to the image and on the lens surface of the positive lens Gp on the image side. A region Y2 is a region in the optical axis direction between a plane (a third plane) that is perpendicular to the optical axis and that passes through a point that is positioned closest to the object and on the lens surface of the negative lens Gn on the object side, and a plane (a fourth plane) that is perpendicular to the optical axis and that passes through a point that is positioned closest to the image and on the lens surface of the negative lens Gn on the image side. A region Y3 is a region in the optical axis direction between a plane (a fifth plane) that is perpendicular to the optical axis and that passes through a point that is positioned closest to the object and on the lens surface of the positive lens Gp2 on the object side, and a plane (a sixth plane) that is perpendicular to the optical axis and that passes through a point that is positioned closest to the image and on the lens surface of the positive lens Gp2 on the image side. In a case in which the lens surface is a protrusion, the point that is on the lens surface and that is closest to the object or that is positioned closest to the image is the intersection between the lens surface and the optical axis of the optical axis of the image pickup optical system. In a case in which the lens surface is a recess, the point on the lens surface that is closest to the object or that is positioned closest to the image is a point that is positioned on the lens surface that is farthest away from the optical axis of the image pickup optical system.

In the lens apparatus of the present exemplary embodiment, the lens holding barrel and the exterior barrel are disposed, with an air gap in between, in the region Y1 that is a region where the positive lens Gp is disposed. With the above, the change in temperature of the positive lens Gp can be reduced effectively and, as a result, the change in the optical characteristic of the entire optical system upon the change in temperature can be reduced. Specifically, the generated amount of spherical aberration upon change in temperature can be reduced effectively.

While it is desirable to dispose the lens holding barrel and the exterior barrel without any air gap in between in order to achieve size reduction in the lens apparatus, in the present exemplary embodiment, priority is given on reducing the change in temperature of the positive lens Gp such that an air gap is provided between the lens holding barrel and the exterior barrel. The size of the air gap is set considering the balance between the size of the lens apparatus in the radial direction and the heat value conducted to the positive lens Gp. Specifically, assuming that the effective diameter of the lens surface of the positive lens Gp on the object side is EDp, the maximum value of the air gap between the lens holding barrel and the exterior barrel in the region between the first plane and the second plane is smaller than 0.2×EDp. With the above, the heat value conducted to the positive lens Gp can be effectively reduced while avoiding increase in the size of the lens apparatus in the radial direction.

Furthermore, the material of the negative lens Gn that is disposed adjacent to the positive lens Gp is typically a material with low dispersion in order to favorably correct the chromatic aberration. In such a case, as described above, the amount of spherical aberration generated in the positive lens upon change in temperature and the amount of spherical aberration generated in the negative lens are added together; accordingly, spherical aberration is easily generated. Accordingly, it is desirable that the lens holding barrel and the exterior barrel are disposed with an air gap in between in the region Y2 as well, which is a region where the negative lens Gn is disposed. Assuming that the effective diameter of the lens surface of the negative lens Gn on the object side is EDn, the maximum value of the air gap between the lens holding barrel and the exterior barrel in the region between the first plane and the fourth plane is smaller than 0.2×EDn. With the above, the heat value conducted to the negative lens Gn can be effectively reduced while avoiding increase in the size of the lens apparatus in the radial direction.

Moreover, in order to favorably correct the chromatic aberration, it is desirable that the positive lens Gp2 formed of a material with low dispersion is disposed adjacent to and on the image side of the negative lens Gn. Since a material with low dispersion includes a material in which the temperature coefficient τ is negative, it is desirable that the lens holding barrel and the exterior barrel are disposed with an air gap in between in the region Y3 as well, which is a region where the positive lens Gp2 is disposed. Assuming that the effective diameter of the lens surface of the positive lens Gp2 on the object side is EDp2, the maximum value of the air gap between the lens holding barrel and the exterior barrel in the region between the first plane and the sixth plane is smaller than 0.2×EDp2. With the above, the heat value conducted to the positive lens Gp2 can be effectively reduced while avoiding increase in the size of the lens apparatus in the radial direction.

Note that it is desirable that a distance between a first contact region and the first plane in the optical axis direction is larger than a distance between a second contact region and the second plane in the optical axis direction. Note that the first contact region refers to the contact regions A and C that are positioned on the object side with respect to the positive lens Gp, and the second contact region refers to the contact region B that is positioned on the image side with respect to the positive lens Gp. Since the effective diameter of the lens disposed on the object side is larger, the lens easily receives heat external to the lens apparatus 100. Accordingly, the heat value conducted to the positive lens Gp can be reduced effectively by increasing, the distance in the optical axis direction between the first contact region and the first plane.

FIG. 3 schematically illustrates transmission paths of an irradiation heat generated in the lens apparatus 100 when receiving a sunlight from the upper portion in the drawing. The lens holding barrel and the exterior barrel included in the lens apparatus are typically formed of a metal material, such as a magnesium alloy, that is high in strength and that is light in weight; accordingly, the lens holding barrel and the exterior barrel easily receive heat external to the lens apparatus such as the sunlight. An irradiation heat D is mainly separated into a component reflected by the exterior barrel, a component radiated into the atmosphere, a component absorbed by the exterior barrel, and components that flow into the inside of the lens barrel through the contact region A, the contact region B, and the contact region C. Among above components, the components that flow into the inside of the lens barrel greatly contribute to the increase in temperature of the lenses. In other words, the change in temperature of the positive lens Gp can be effectively reduced by distancing away the contact regions of the lens holding barrel and the exterior barrel from the positive lens Gp.

The transmission paths of the irradiation heat in the contact region A will be described. The heat conducted to the lens holding barrel through the contact region A is conducted towards the object side and the image side as illustrated by arrows A1 and A2 in the drawing. While diffusing heat externally in the region X, the heat conducted through the path A2 is conducted to the positive lens Gp.

In the contact region B, the fourth lens holding barrel 6 is in contact with the third exterior barrel 7 through the connection barrel 5. The heat that is conducted to the fourth lens holding barrel 6 and the connection barrel 5 through the contact region B is conducted towards the object side and the image side as illustrated by arrows B1, B2, and B3 in the drawing. The heat conducted to the connection barrel 5 passes through path B3 and is conducted towards the image side. The heat conducted to the fourth lens holding barrel 6 passes through paths B1 and B2 and is conducted towards the object side and the image side. While diffusing heat externally in the regions Y2 and Z, the heat conducted through the path B1 is conducted to the positive lens Gp. The heat conducted to the fourth lens holding barrel 6 through the contact region C is conducted towards the object side and the image side as illustrated by arrows C1 and C2 in the drawing. However, since the contact region C is positioned away from the positive lens Gp, the heat value of the heat passing through the path C2 and conducted to the positive lens Gp becomes relatively small.

A configuration of the image pickup optical system included in the lens apparatus 100 of each exemplary embodiment will be described next. The image pickup optical system of each exemplary embodiment includes the lens G1 disposed closest to the object, and the positive lens Gp that is disposed on the image side with respect to the lens G1 and that is formed of a material with low dispersion. Furthermore, the negative lens Gn is disposed adjacent to and on the image side of the positive lens Gp, and the positive lens Gp2 is disposed adjacent to and on the image side of the negative lens Gn. Moreover, the focusing unit that moves during focusing is disposed on the image side of the positive lens Gp2. The image pickup optical system of the present exemplary embodiment is a so-called telephoto optical system in which the distance along the optical axis from the lens surface of the lens disposed closest to the object to the image plane is shorter than the focal length of the entire system.

Figure 4:
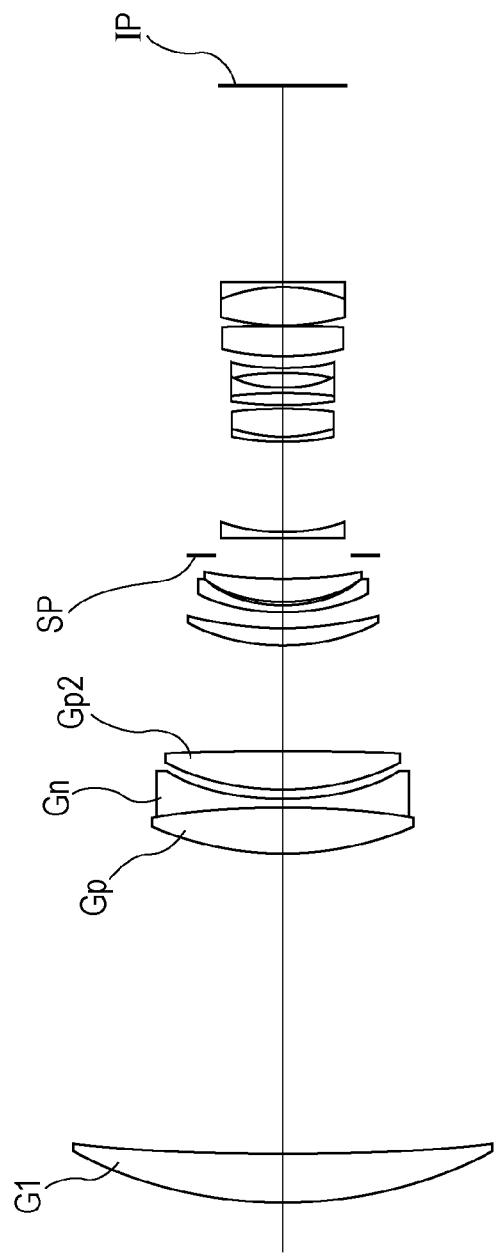
FIG. 4 is a cross-sectional view of lenses of an optical system of a first exemplary embodiment.
Figure 5:
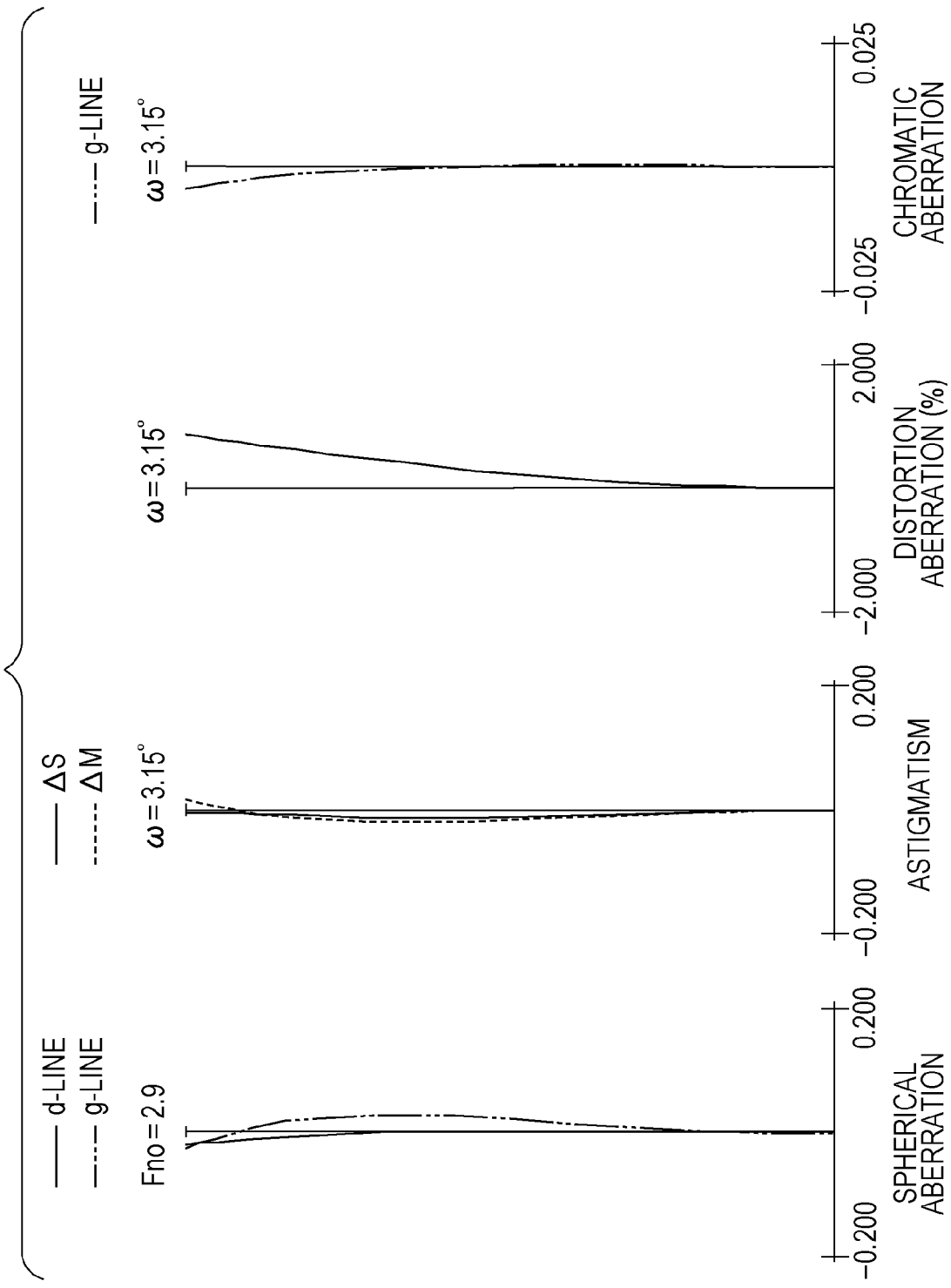
FIG. 5 is an aberration diagram of the optical system of the first exemplary embodiment while focusing to infinity.
Figure 6:
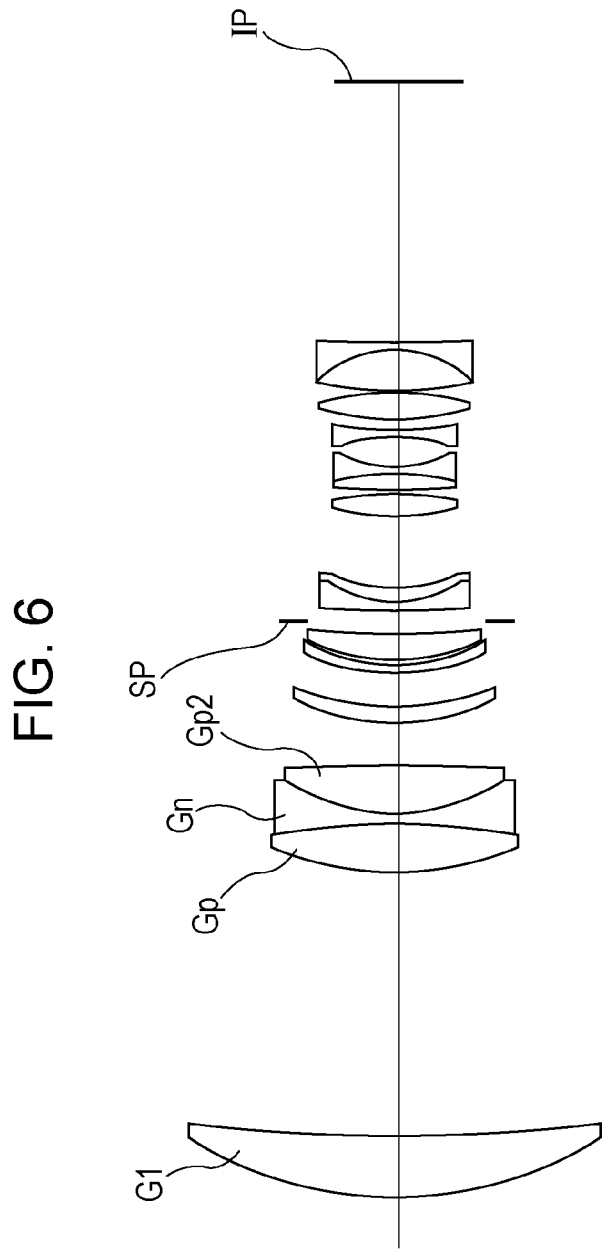
FIG. 6 is a cross-sectional view of lenses of an optical system of a second exemplary embodiment.
Figure 7:
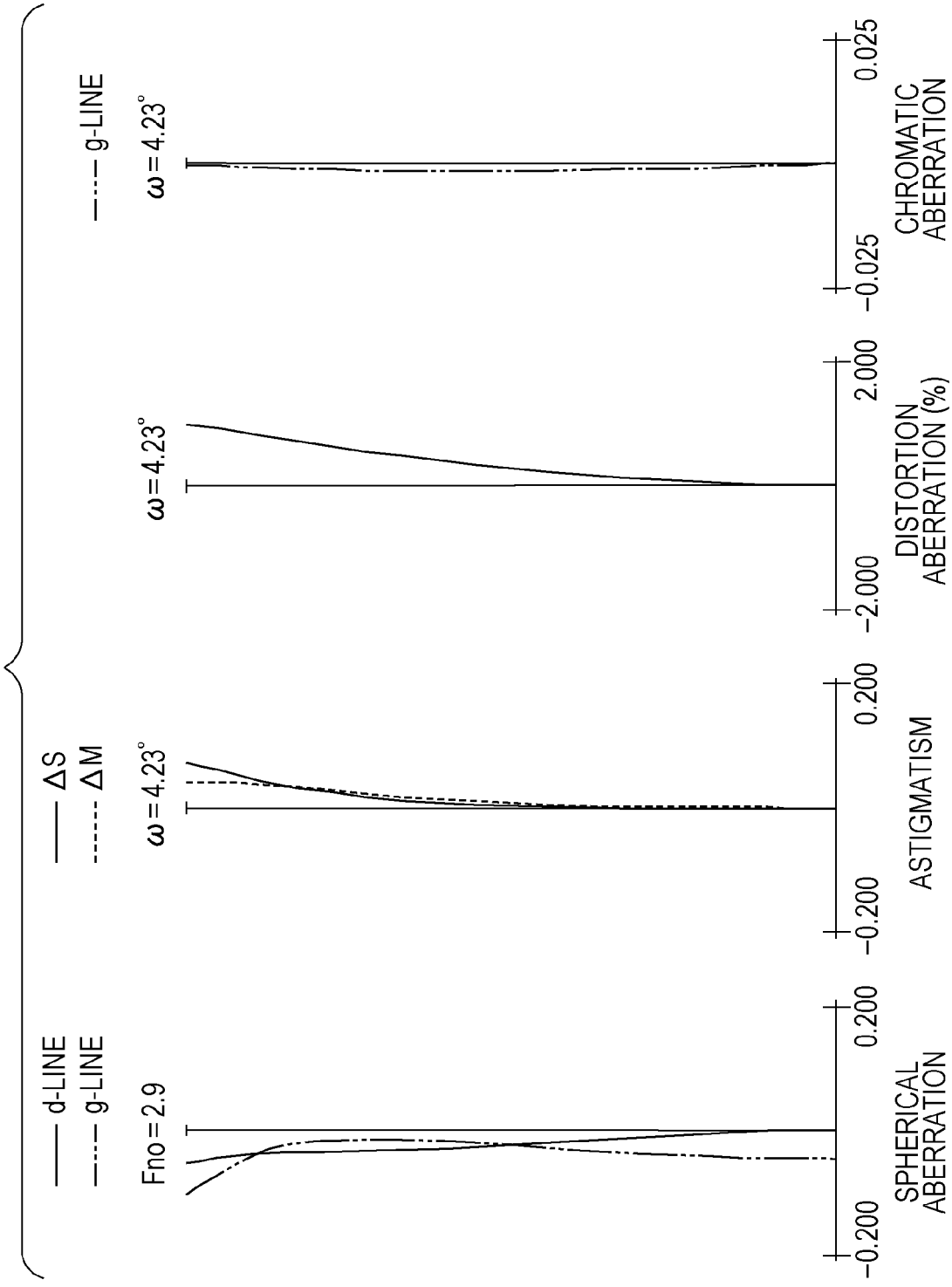
FIG. 7 is an aberration diagram of the optical system of the second exemplary embodiment while focusing to infinity.
Figure 8:
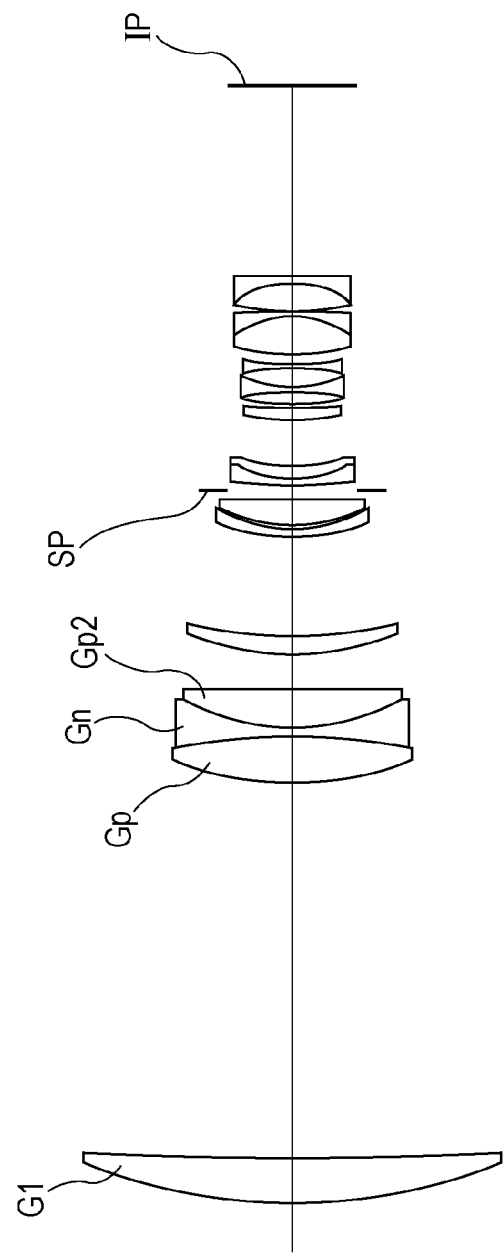
FIG. 8 is a cross-sectional view of lenses of an optical system of a third exemplary embodiment.
Figure 9:
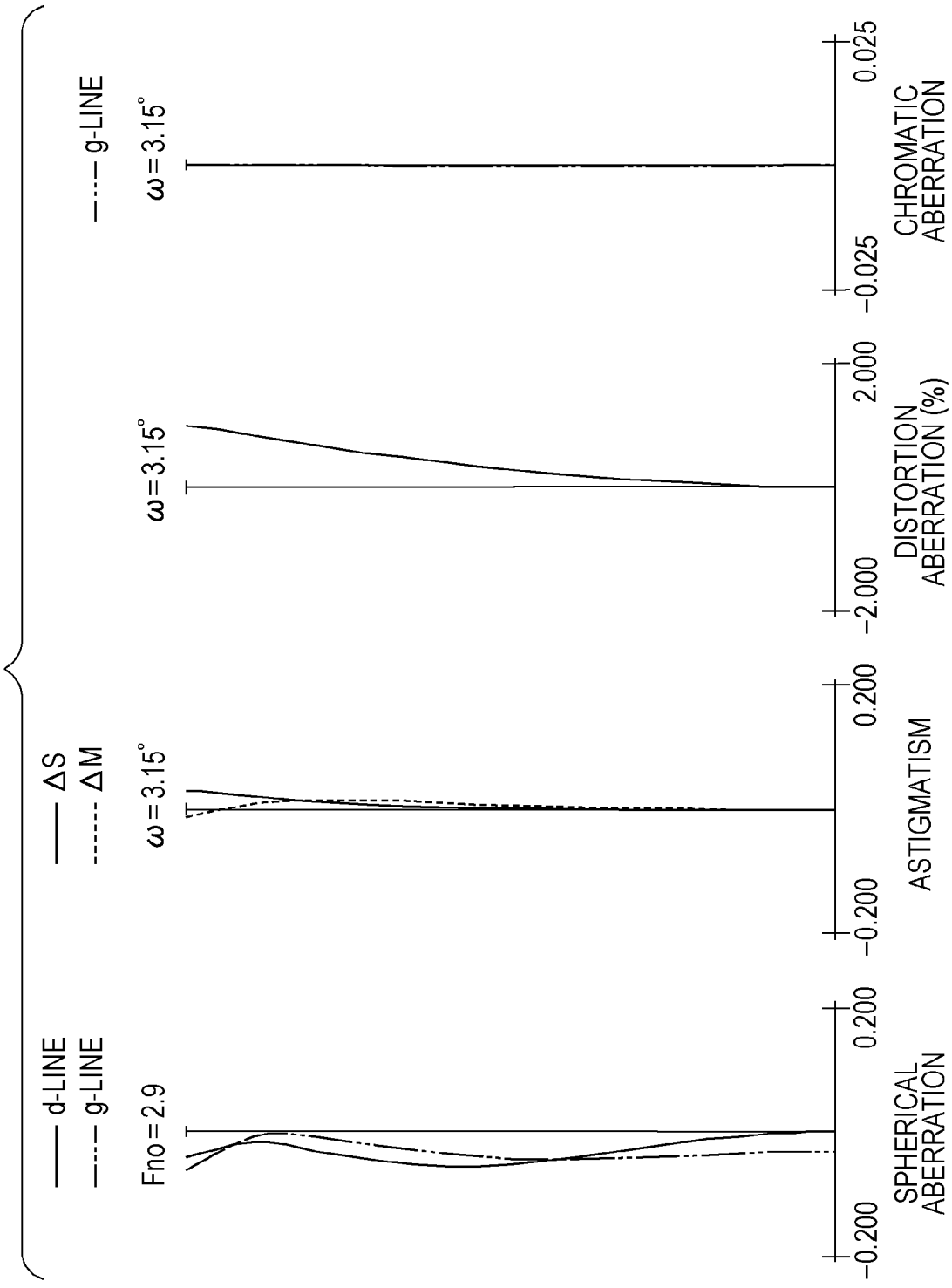
FIG. 9 is an aberration diagram of the optical system of the third exemplary embodiment while focusing to infinity.
Figure 10:
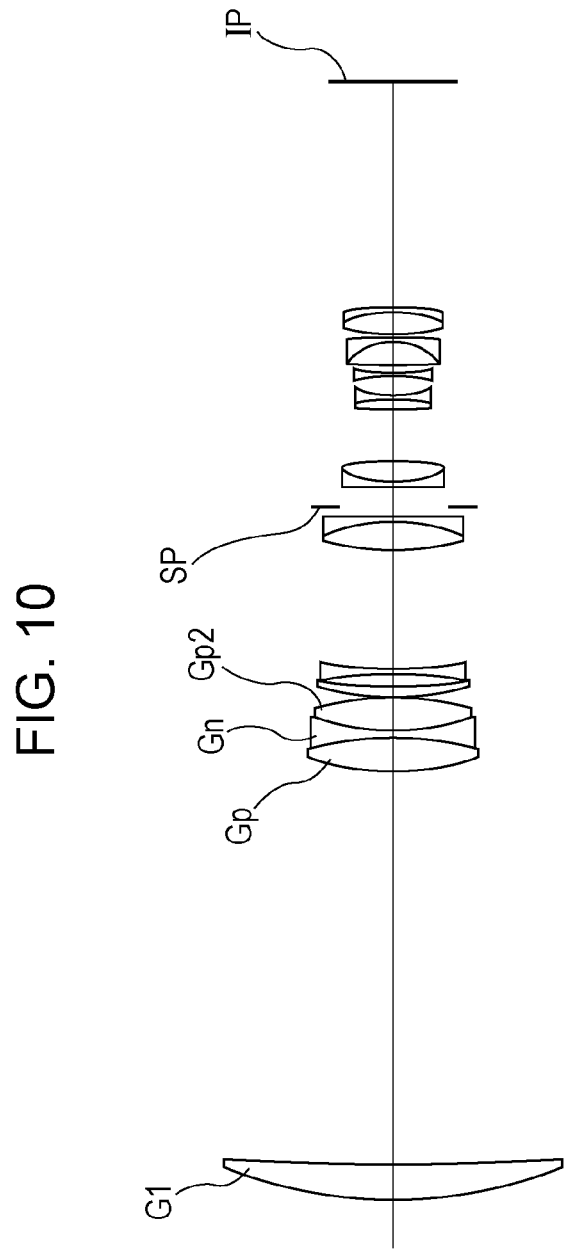
FIG. 10 is a cross-sectional view of lenses of an optical system of a fourth exemplary embodiment.
Figure 11:
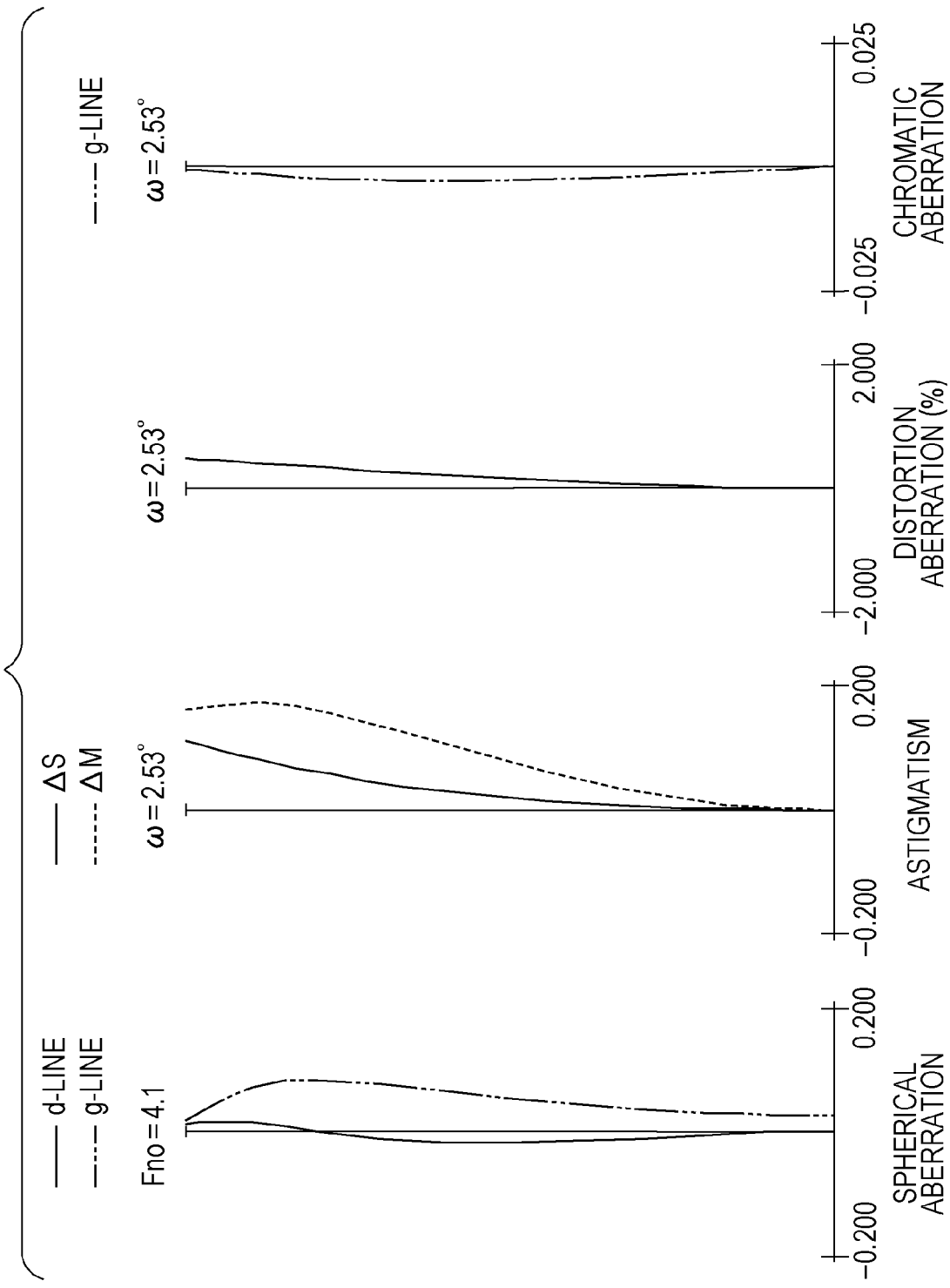
FIG. 11 is an aberration diagram of the optical system of the fourth exemplary embodiment while focusing to infinity.
Figure 12:
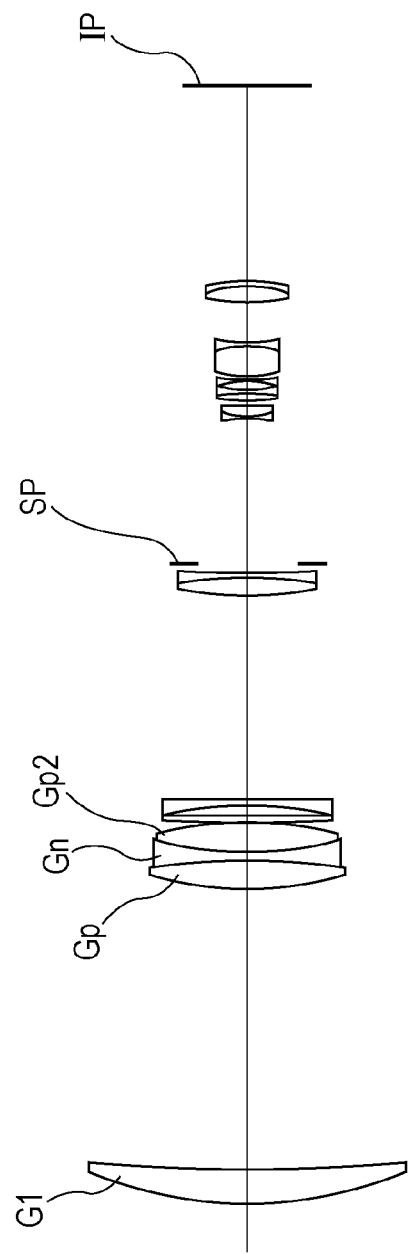
FIG. 12 is a cross-sectional view of lenses of an optical system of a fifth exemplary embodiment.
Figure 13:
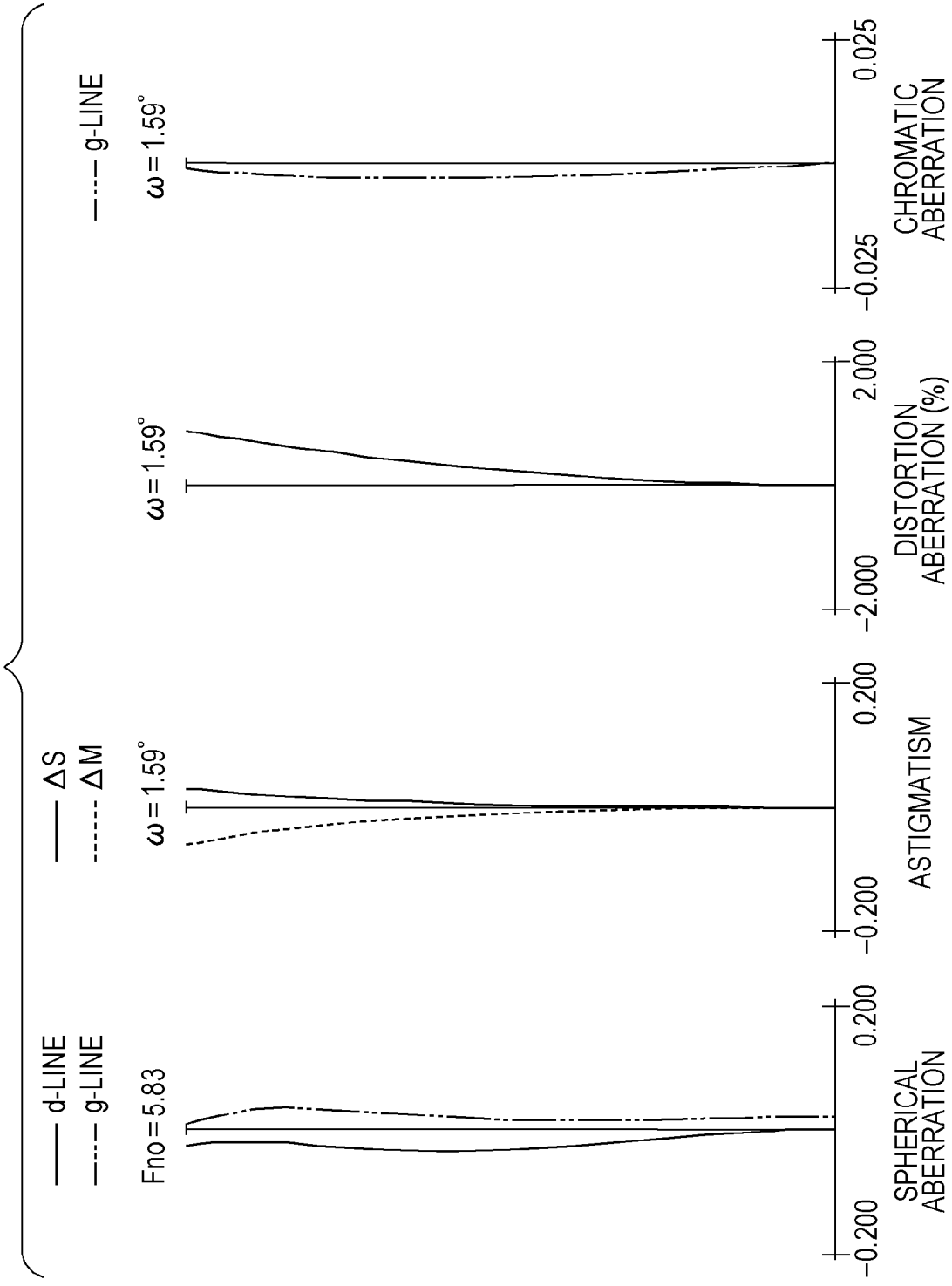
FIG. 13 is an aberration diagram of the optical system of the fifth exemplary embodiment while focusing to infinity.

FIG. 4 is a cross-sectional view of lenses of an optical system of a first exemplary embodiment. FIG. 5 is an aberration diagram of the optical system of the first exemplary embodiment while focusing to infinity. FIG. 6 is a cross-sectional view of lenses of an optical system of a second exemplary embodiment. FIG. 7 is an aberration diagram of the optical system of the second exemplary embodiment while focusing to infinity. FIG. 8 is a cross-sectional view of lenses of an optical system of a third exemplary embodiment. FIG. 9 is an aberration diagram of the optical system of the third exemplary embodiment while focusing to infinity. FIG. 10 is a cross-sectional view of lenses of an optical system of a fourth exemplary embodiment. FIG. 11 is an aberration diagram of the optical system of the fourth exemplary embodiment while focusing to infinity. FIG. 12 is a cross-sectional view of lenses of an optical system of a fifth exemplary embodiment. FIG. 13 is an aberration diagram of the optical system of the fifth exemplary embodiment while focusing to infinity.

Figure 14:
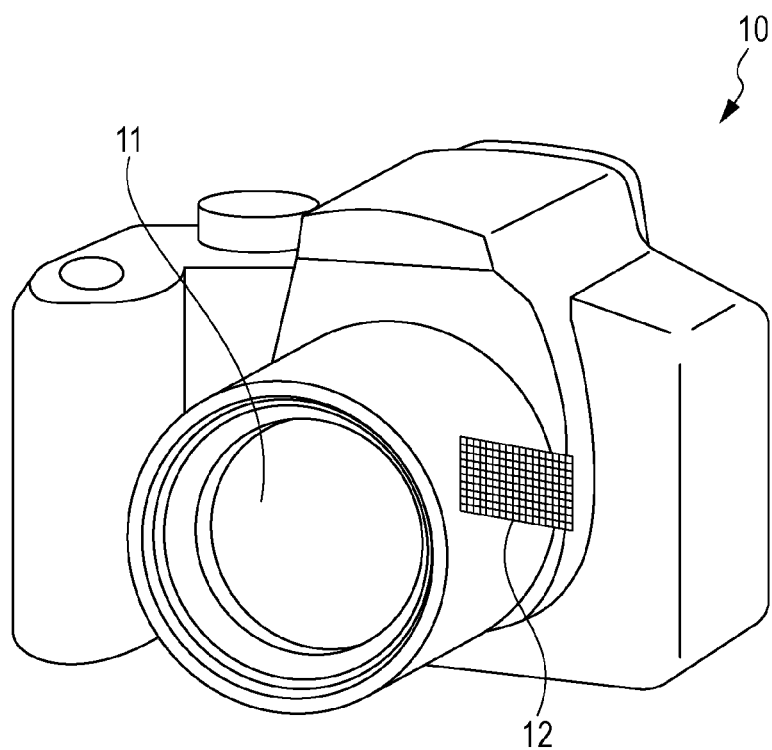
FIG. 14 is a schematic view of an essential portion of an image pickup apparatus.

FIG. 14 is a schematic diagram illustrating an essential portion of an image pickup apparatus including an optical system of one of the exemplary embodiments. The optical system of each exemplary embodiment is an imaging lens system that is used in image pickup apparatuses, such as a video camera, a digital camera, a silver-halide film camera, and a television camera. In the cross-sectional views of the lenses, the left side is the object side (the front side) and the right side is the image side (the back side).

In each exemplary embodiment, IP denotes an image plane, and in a case in which the optical system is used as an image pickup optical system of a video camera or a digital camera, the image plane IP corresponds to a solid state image pickup element (a photo electric transducer), such as a CCD sensor or a CMOS sensor. In a case in which the optical system of one of the exemplary embodiments is used as an image pickup optical system of a silver-halide film camera, the image plane IP corresponds to a surface of the film. Reference sign SP denotes an aperture diaphragm.

In the spherical aberration diagrams, Fno denotes an F-number and depicts the spherical aberration for a d-line (a wave length of 587.6 nm) and for a g-line (a wave length of 435.8 nm). In the astigmatism diagrams, $\Delta S$ depicts an astigmatism amount in a sagittal image plane, $\Delta M$ depicts an astigmatism amount in a meridional image plane. Distortion aberration diagrams each depict a d-line. Chromatic aberration diagrams each depict chromatic aberration for a g-line. Reference sign $\omega$ refers to an imaging half field angle.

In the lens apparatus of each exemplary embodiment, focusing on the fact that a lens with a large effective diameter is easily affected by the change in temperature, the materials of the lens G1 and the positive lens Gp, and the configuration of the holding mechanism that holds the image pickup optical system are appropriately set. Specifically, the holding member of the positive lens Gp and the exterior member that accommodates the holding member are disposed so as to have an air gap in between so that external heat is not easily conducted to the positive lens Gp.

Furthermore, it is assumed that the lens apparatus of each exemplary embodiment includes a telephoto image pickup optical system; accordingly, it is important to reduce the change in optical characteristic of the image pickup optical system cause by the change in temperature, as well as reducing the chromatic aberration of the image pickup optical system.

Note that Abbe constant $\nu d$ and partial dispersion ratio $\theta gF$ are known as parameters related to the correction of chromatic aberration in an optical system. Assuming that Ng, NF, NC, and Nd are indexes of refraction of a material against a g-line (a wave length of 435.8 nm), an F-line (486.1 nm), a C-line (656.3 nm), and a d-line (587.6 nm), respectively, the Abbe constant $\nu d$ and the partial dispersion ratio $\theta gF$ are each expressed as follows.

$$\nu d = (Nd-1)/(NF-NC)$$

$$\theta gF = (Ng-NF)/(NF-NC)$$

In an optical system that has, as a whole, a positive refractive power, the generated amount of primary chromatic aberration can be reduced by using a material with a large Abbe constant (a material with low dispersion) as the material of the positive lens. In the exemplary embodiments, the primary chromatic aberration is effectively reduced by disposing the positive lens Gp formed of a material with low dispersion.

Anomalous dispersion of a material used in a lens will be described next.

In a case in which $$\Delta\theta gF = \theta gF - (0.6438 - 0.001682 \times \nu d) \quad (A)$$

holds true, in many materials, the numerical value of equation (A) is a value that approximates zero. As the numerical value of equation (A) becomes farther away from zero, the anomalous dispersion of the material becomes higher.

In an optical system that has, as a whole, a positive refractive power, the secondary spectrum of chromatic aberration can be reduced by using a material in which the value of equation (A) is large as the material of the positive lens.

As described above, by disposing the positive lens formed of a material in which the value of equation (A) is large and that has low dispersion near, to the object, the primary chromatic aberration and the secondary spectrum can be reduced effectively. The above is because in a lens that is disposed on the object side, the effective diameter is large and the incident heights of the off-axis ray and the on-axis ray are large.

Generally, the temperature coefficient of a material in which the value of equation (A) is large and that has low dispersion has a negative value and, as described above, in the image pickup optical system, a large spherical aberration is easily generated. Accordingly, in the exemplary embodiments, the holding mechanism of the positive lens Gp is configured appropriately such that the change in temperature of the positive lens Gp formed of a material with low dispersion is reduced.

Assuming that $\nu dp$ is an Abbe constant of the material of the positive lens Gp, the lens apparatus of each exemplary embodiment satisfies the following conditional expression (1).

$$80.0 < \nu dp \quad (1)$$

By appropriately setting the material of the positive lens Gp such that conditional expression (1) is satisfied, the primary chromatic aberration can be reduced effectively. It is not desirable to use a material that goes below the lower limit of conditional expression (1) as the material of the positive lens Gp, since it will be difficult to sufficiently reduce the primary chromatic aberration.

Note that in each exemplary embodiment, preferably, the range of the numerical value of conditional expression (1) is set as follows.

$$85.0 < \nu dp \quad (1a)$$

Furthermore, more preferably, the range of the numerical value of conditional expression (1) is set as follows.

$$90.0 < \nu dp \quad (1b)$$

Furthermore, more preferably, each exemplary embodiment satisfies one or more of the following conditional expressions:

$$-2.0 \times 10^{-5} < \tau p < 0 \quad (2)$$

$$0.15 < fp/f < 0.60 \quad (3)$$

where $\tau p$ is a temperature coefficient of the material of the positive lens Gp, f is a focal length of the entire optical system, and fp is a focal length of the positive lens Gp.

Conditional expression (2) is a conditional expression defining the temperature coefficient $\tau p$ of the material of the positive lens Gp. Conditional expression (2) indicates that the temperature coefficient τp has a negative value. When under the lower limit of conditional expression (2), the absolute value of the temperature coefficient of the material of the positive lens Gp becomes excessively large, and the amount of change in the refractive index of the positive lens Gp upon change in temperature becomes large. It is not desirable since, as a result of the above, a large spherical aberration is generated and it will be difficult to reduce the spherical aberration in the overall optical system.

Conditional expression (3) is a conditional expression defining the ratio between the focal length fp of the positive lens Gp and the focal length f of the entire optical system. When the focal length fp of the lens Gp becomes short going below the lower limit of the conditional expression (3), the refractive power of the positive lens Gp becomes too strong. It is not desirable since, as a result of the above, the change in optical characteristic of the positive lens Gp upon the change in temperature becomes large and the amount of change in spherical aberration upon the change in temperature of the optical system as a whole becomes large. When the focal length fp of the positive lens Gp becomes long exceeding the upper limit of the conditional expression (3), the refractive power of the positive lens Gp becomes too weak. It is not desirable since, as a result of the above, the balance between the positive lens and the negative lens correcting the primary chromatic aberration is upset and it will be difficult to reduce the primary chromatic aberration of the optical system as a whole.

Note that the range of the numerical value of each of the conditional expressions (2) and (3) is, preferably, set in the following manner.

$$-1.5\times10^{-5}<\tau p<0 \quad (2a)$$

$$0.20<fp/f<0.55 \quad (3a)$$

The range of the numerical value of each of the conditional expressions (2) and (3) is, more preferably, set in the following manner.

$$-1.2\times10^{-5}<\tau p<0 \quad (2b)$$

$$0.25<fp/f<0.50 \quad (3b)$$

Furthermore, when the correction of the chromatic aberration of the optical system as a whole is taken into consideration, it is desirable that the negative lens Gn is disposed near the positive lens Gp. The chromatic aberration of the optical system as a whole can be reduced by correcting the chromatic aberration in a well-balanced manner with the positive lens Gp and the negative lens Gn. Note that from the viewpoint of correction of chromatic aberration, it is desirable that the negative lens Gn is disposed at a position adjacent to the positive lens Gp.

More preferably, each exemplary embodiment satisfies one or more of the following conditional expressions:

$$0<\tau n<1.0\times10^{-6} \quad (4)$$

$$20.0<vdn<45.0 \quad (5)$$

$$0.07<-fn/f<0.30 \quad (6)$$

where τn is a temperature coefficient of a material of the negative lens Gn, vdn is an Abbe constant, and fn is a focal length of the negative lens Gn.

Conditional expression (4) is a conditional expression defining the temperature coefficient τn of the material of the negative lens Gn. Conditional expression (4) indicates that the temperature coefficient τn has a positive value. The amount of change in refractive index of the negative lens Gn upon the change in temperature can be reduced by using, as the material of the negative lens Gn, a material in which the absolute value of the temperature coefficient is small. It is not desirable to use a material that exceeds the upper limit of conditional expression (4) as the material of the negative lens Gn, since the amount of change in refractive index of the negative lens Gn upon change in temperature becomes large and it will be difficult to reduce the spherical aberration of the optical system as a whole.

Conditional expression (5) is a conditional expression defining the Abbe constant vdn of the material of the negative lens Gn. By appropriately setting the material of the negative lens Gn such that conditional expression (5) is satisfied, the primary chromatic aberration can be corrected effectively. It is not desirable to use a material that goes below the lower limit of conditional expression (5) as the material of the negative lens Gn, since the primary chromatic aberration will be excessively corrected. It is not desirable to use a material that exceeds the upper limit of conditional expression (5) as the material of the negative lens Gn, since it will be difficult to sufficiently correct the primary chromatic aberration.

Conditional expression (6) is a conditional expression defining the ratio between the focal length fn of the negative lens Gn and the focal length f of the entire optical system. When the focal length fn of the lens Gn becomes short going below the lower limit of the conditional expression (6), the refractive power of the negative lens Gn becomes too strong. It is not desirable since, as a result of the above, the change in optical characteristic of the negative lens Gn upon the change in temperature becomes large and the amount of change in spherical aberration upon the change in temperature of the optical system as a whole becomes large. When the focal length fn of the negative lens Gn becomes long exceeding the upper limit of the conditional expression (6), the refractive power of the negative lens Gn becomes too weak. It is not desirable since, as a result of the above, the balance between the positive lens and the negative lens correcting the primary chromatic aberration is upset and it will be difficult to reduce the primary chromatic aberration of the optical system as a whole.

Note that the range of the numerical value of each of the conditional expressions (4) to (6) is, preferably, set in the following manner.

$$0<\tau n<0.9\times10^{-6} \quad (4a)$$

$$22.0<vdn<46.0 \quad (5a)$$

$$0.08<-fn/f<0.25 \quad (6a)$$

The range of the numerical value of each of the conditional expressions (4) to (6) is, more preferably, set in the following manner.

$$0<\tau n<0.8\times10^{-6} \quad (4b)$$

$$24.0<vdn<28.0 \quad (5b)$$

$$0.10<-fn/f<0.22 \quad (6b)$$

Moreover, assuming that τp2 is a temperature coefficient related to the refractive index of the material of the positive lens Gp2 disposed adjacent to the negative lens Gn and on the image side of the negative lens Gn, desirably, the following conditional expression is satisfied.

$$-2.0\times10^{-5}<\tau p2<0 \quad (7)$$

Conditional expression (7) is a conditional expression defining the temperature coefficient τp2 of the material of the positive lens Gp2. Conditional expression (7) indicates that the temperature coefficient τp2 has a negative value. When under the lower limit of conditional expression (7), the absolute value of the temperature coefficient of the material of the positive lens Gp2 becomes excessively large, and the amount of change in the refractive index of the positive lens Gp2 upon change in temperature becomes large. It is not desirable since, as a result of the above, a large spherical aberration is generated and it will be difficult to reduce the spherical aberration in the overall optical system.

Note that the range of the numerical value of the conditional expression (7) is, preferably, set in the following manner.

$$-1.5\times10^{-5} < \tau p2 < 0 \quad (7a)$$

The range of the numerical value of the conditional expression (7) is, more preferably, set in the following manner.

$$-1.2\times10^{-5} < \tau p2 < 0 \quad (7b)$$

Furthermore, the following conditional expressions are, preferably, satisfied, $$-1.0\times10^{-6} < \tau 1 < 1.0\times10^{-6} \quad (8)$$

$$0.30 < |f1/f| < 1.00 \quad (9)$$

$$0.17 < D1p/LD < 0.50 \quad (10)$$

where τ1 is a temperature coefficient of a material of the lens G1 disposed closest to the object, f1 is a focal length of the lens G1, D1p is a distance between the lens G1 and the positive lens Gp along the optical axis, and LD is a distance along the optical axis from the lens surface in the optical system that is closest to the object to the image plane.

Conditional expression (8) is a conditional expression defining the temperature coefficient τ1 of the material of the lens G1. The lens G1 is a lens in the optical system that is disposed closest to the object, and the effective diameter of the lens G1 becomes easily large. Accordingly, the lens G1 easily receives heat external to the lens apparatus and the temperature of the lens G1 changes greatly. The change in temperature of the lens G1 can be reduced and the change in optical characteristic can be made small by using, as the material of the lens G1, a material in which the absolute value of the temperature coefficient is small. It is not desirable to use a material that exceeds the upper limit of conditional expression (8) and a material that goes below the lower limit of conditional expression (8) as the material of the lens G1, since the change in temperature of the lens G1 becomes large and it will be difficult to reduce the spherical aberration of the optical system as a whole.

Conditional expression (9) is a conditional expression defining the ratio between a focal length f1 of the lens G1 and the focal length f of the entire optical system. When the focal length f1 of the lens G1 becomes short going below the lower limit of the conditional expression (9), the refractive power of the lens G1 becomes too strong. It is not desirable since, as a result of the above, the change in optical characteristic of the lens G1 upon the change in temperature becomes large and the amount of change in spherical aberration upon the change in temperature of the optical system as a whole becomes large. When the focal length f1 of the lens G1 becomes long exceeding the upper limit of the conditional expression (9), the refractive power of the lens G1 becomes too weak. It is not desirable since, as a result of the above, the balance between the positive lens and the negative lens correcting the primary chromatic aberration is upset and it will be difficult to reduce the primary chromatic aberration of the optical system as a whole.

Conditional expression (10) is a conditional expression defining the ratio between a distance Dip along the optical axis from the lens G1 to the positive lens Gp, and a distance LD along the optical axis from the lens surface of the optical system that is closest to the object to the image plane. When the distance Dip becomes short going below the lower value of the conditional expression (10), the effective diameter of the positive lens Gp becomes large, and the distance between the holding member of the positive lens Gp and the exterior member becomes small. It is not desirable since, as a result of the above, the heat value added to the positive lens Gp becomes large, the change in temperature of the positive lens Gp becomes large, and the amount of change in optical characteristic of the positive lens Gp becomes large. When the distance Dip becomes long exceeding the upper limit of the conditional expression (10), the height of the on-axis ray entering the positive lens Gp becomes low. It is not desirable since, as a result of the above, the balance between the positive lens and the negative lens correcting the primary chromatic aberration is upset and it will be difficult to reduce the primary chromatic aberration of the optical system as a whole.

Note that the range of the numerical value of each of the conditional expressions (8) to (10) is, preferably, set in the following manner.

$$-0.9\times10^{-6} < \tau 1 < 0.9\times10^{-6} \quad (8a)$$

$$0.40 < |f1/f| < 0.90 \quad (9a)$$

$$0.20 < D1p/LD < 0.45 \quad (10a)$$

The range of the numerical value of each of the conditional expressions (8) to (10) is, more preferably, set in the following manner.

$$-0.8\times10^{-6} < \tau 1 < 0.8\times10^{-6} \quad (8b)$$

$$0.45 < |f1/f| < 0.88 \quad (9b)$$

$$0.22 < D1p/LD < 0.40 \quad (10b)$$

First to fifth numerical embodiments corresponding to the first to fifth exemplary embodiments of the present disclosure, respectively, will be set forth next. In each numerical embodiment, i denotes the order of the optical surface from the object side, such that ri denotes the radius of curvature of an $i^{th}$ optical surface (an $i^{th}$ surface), di denotes the distance between the $i^{th}$ surface and the $i+1^{th}$ surface, ndi and vdi denote the refractive index and the Abbe constant for the d-line regarding the material of the $i^{th}$ optical member.

In each numerical embodiment, back focus (BF) indicates the distance in air conversion length from the surface of the optical system that is closest to the image to the image plane. Furthermore, the correspondence between the numerical embodiments and the conditional expressions described above is illustrated in Table. In Table, ΔθgFi represents a numerical value of θgFi−(0.6438−0.001682×vdi).

First Numerical Embodiment

UNIT mm
SURFACE DATA

| SURFACE NUMBER | r | d | nd | vd | EFFECTIVE DIAMETER |
| --- | --- | --- | --- | --- | --- |

-continued

| | | | | | |
|---|---|---|---|---|---|
| 1 | 150.642 | 16.15 | 1.59270 | 35.3 | 135.36 |
| 2 | 730.042 | 100.00 | | | 134.20 |
| 3 | 107.703 | 14.79 | 1.43387 | 95.1 | 84.27 |
| 4 | −328.442 | 0.27 | | | 82.15 |
| 5 | −318.403 | 3.00 | 1.85478 | 24.8 | 81.94 |
| 6 | 87.265 | 3.08 | | | 76.51 |
| 7 | 88.737 | 12.63 | 1.43387 | 95.1 | 76.87 |
| 8 | −1026.629 | 35.00 | | | 76.22 |
| 9 | 68.568 | 6.10 | 1.89286 | 20.4 | 62.07 |
| 10 | 127.179 | 5.00 | | | 60.58 |
| 11 | 68.368 | 2.30 | 1.65412 | 39.7 | 55.04 |
| 12 | 43.418 | 1.15 | | | 51.09 |
| 13 | 48.830 | 7.97 | 1.43387 | 95.1 | 51.07 |
| 14 | 133.424 | 7.57 | | | 49.03 |
| 15 (APERTURE) | ∞ | 5.89 | | | 44.73 |
| 16 | −3151.717 | 1.87 | 1.91082 | 35.3 | 40.00 |
| 17 | 61.271 | 30.34 | | | 38.04 |
| 18 | 97.234 | 1.76 | 1.92286 | 20.9 | 33.23 |
| 19 | 63.011 | 9.17 | 1.56732 | 42.8 | 32.60 |
| 20 | −96.758 | 1.07 | | | 33.13 |
| 21 | 110.488 | 4.14 | 1.85025 | 30.1 | 32.94 |
| 22 | −106.157 | 1.44 | 1.59522 | 67.7 | 32.67 |
| 23 | 36.770 | 5.26 | | | 31.17 |
| 24 | −77.293 | 1.47 | 1.72916 | 54.7 | 31.20 |
| 25 | 75.820 | 4.11 | | | 32.49 |
| 26 | 89.505 | 10.00 | 1.64769 | 33.8 | 36.21 |
| 27 | −216.973 | 0.15 | | | 38.52 |
| 28 | 77.954 | 12.44 | 1.73800 | 32.3 | 39.99 |
| 29 | −58.563 | 2.00 | 1.80809 | 22.8 | 39.98 |
| 30 | ∞ | 3.00 | | | 40.13 |
| 31 | ∞ | 2.20 | 1.51633 | 64.1 | 42.00 |
| 32 | ∞ | 60.70 | | | 42.00 |

| | |
|---|---|
| IMAGE PLANE | ∞ |
| FOCAL LENGTH | 392.55 |
| F-number | 2.90 |
| HALF FIELD ANGLE | 3.15 |
| IMAGE HEIGHT | 21.64 |
| TOTAL LENS LENGTH | 372.00 |
| BF | 60.70 |
| POSITION OF ENTRANCE PUPIL | 532.27 |
| POSITION OF EXIT PUPIL | −109.30 |
| FRONT PRINCIPAL POINT POSITION | 18.38 |
| REAR PRINCIPAL POINT POSITION | −331.85 |

DATA OF SINGLE LENS

| LENS | STARTING SURFACE | FOCAL LENGTH |
|---|---|---|
| 1 | 1 | 316.96 |
| 2 | 3 | 188.88 |
| 3 | 5 | −79.86 |
| 4 | 7 | 188.90 |
| 5 | 9 | 158.84 |
| 6 | 11 | −188.77 |
| 7 | 13 | 172.59 |
| 8 | 16 | −65.97 |
| 9 | 18 | −198.89 |
| 10 | 19 | 68.69 |
| 11 | 21 | 64.24 |
| 12 | 22 | −45.71 |
| 13 | 24 | −52.28 |
| 14 | 26 | 99.10 |
| 15 | 28 | 47.14 |
| 16 | 29 | −72.47 |

Second Numerical Embodiment

UNIT mm
SURFACE DATA

| SURFACE NUMBER | r | d | ad | vd | EFFECTIVE DIAMETER |
|---|---|---|---|---|---|

-continued

| | | | | | |
|---|---|---|---|---|---|
| 1 | 99.464 | 14.87 | 1.59270 | 35.3 | 101.04 |
| 2 | 456.909 | 64.58 | | | 99.29 |
| 3 | 80.681 | 11.90 | 1.43387 | 95.1 | 62.00 |
| 4 | −167.967 | 0.15 | | | 60.11 |
| 5 | −166.869 | 2.30 | 1.85478 | 24.8 | 59.92 |
| 6 | 51.072 | 0.15 | | | 54.95 |
| 7 | 50.726 | 11.60 | 1.43387 | 95.1 | 55.04 |
| 8 | −770.506 | 10.68 | | | 54.62 |
| 9 | 59.715 | 3.81 | 1.89286 | 20.4 | 50.66 |
| 10 | 74.063 | 8.36 | | | 49.33 |
| 11 | 58.185 | 2.00 | 1.65412 | 39.7 | 45.60 |
| 12 | 45.596 | 1.04 | | | 43.86 |
| 13 | 51.918 | 6.42 | 1.90366 | 31.3 | 43.79 |
| 14 | 206.154 | 3.00 | | | 42.24 |
| 15 (APERTURE) | ∞ | 2.91 | | | 40.40 |
| 16 | 2015.159 | 1.90 | 1.91082 | 35.3 | 37.51 |
| 17 | 32.641 | 3.50 | 1.84666 | 23.8 | 34.33 |
| 18 | 43.038 | 17.66 | | | 33.42 |
| 19 | 64.610 | 5.62 | 1.49700 | 81.5 | 31.81 |
| 20 | −78.046 | 1.00 | | | 31.84 |
| 21 | 469.814 | 3.84 | 1.85478 | 24.8 | 30.43 |
| 22 | −64.210 | 1.50 | 1.60311 | 60.6 | 30.18 |
| 23 | 33.512 | 7.59 | | | 28.87 |
| 24 | −47.827 | 1.50 | 1.60311 | 60.6 | 29.44 |
| 25 | 93.980 | 2.80 | | | 31.60 |
| 26 | 77.014 | 6.40 | 1.59551 | 39.2 | 36.97 |
| 27 | −82.425 | 0.42 | | | 37.69 |
| 28 | 108.793 | 10.03 | 1.85478 | 24.8 | 38.99 |
| 29 | −32.591 | 2.00 | 1.89286 | 20.4 | 38.97 |
| 30 | 1236.437 | 0.19 | | | 39.14 |
| 31 | ∞ | 2.20 | 1.51633 | 64.1 | 40.00 |
| 32 | ∞ | 62.03 | | | 40.00 |

| | |
|---|---|
| IMAGE PLANE | ∞ |
| FOCAL LENGTH | 292.46 |
| F-NUMBER | 2.90 |
| HALF FIELD ANGLE | 4.23 |
| IMAGE HEIGHT | 21.64 |
| TOTAL LENS LENGTH | 273.98 |
| BF | 62.03 |
| POSITION OF ENTRANCE PUPIL | 301.22 |
| POSITION OF EXIT PUPIL | −71.11 |
| FRONT PRINCIPAL POINT POSITION | −48.75 |
| REAR PRINCIPAL POINT POSITION | −230.43 |

DATA OF SINGLE LENS

| LENS | STARTING SURFACE | FOCAL LENGTH |
|---|---|---|
| 1 | 1 | 211.24 |
| 2 | 3 | 127.46 |
| 3 | 5 | −45.53 |
| 4 | 7 | 110.16 |
| 5 | 9 | 306.80 |
| 6 | 11 | −343.79 |
| 7 | 13 | 75.30 |
| 8 | 16 | −36.44 |
| 9 | 17 | 138.24 |
| 10 | 19 | 72.07 |
| 11 | 21 | 66.31 |
| 12 | 22 | −36.30 |
| 13 | 24 | −52.35 |
| 14 | 26 | 67.87 |
| 15 | 28 | 30.33 |
| 16 | 29 | −35.54 |

Third Numerical Embodiment

UNIT mm
SURFACE DATA

| SURFACE NUMBER | r | d | nd | vd | EFFECTIVE DIAMETER |
|---|---|---|---|---|---|

-continued

| | | | | | |
|---|---|---|---|---|---|
| 1 | 178.783 | 15.20 | 1.59270 | 35.3 | 135.31 |
| 2 | 1415.744 | 124.89 | | | 134.26 |
| 3 | 108.327 | 15.15 | 1.43387 | 95.1 | 78.98 |
| 4 | −192.136 | 0.15 | | | 76.97 |
| 5 | −197.207 | 3.00 | 1.85478 | 24.8 | 76.67 |
| 6 | 76.176 | 0.15 | | | 71.84 |
| 7 | 73.738 | 12.64 | 1.43387 | 95.1 | 72.03 |
| 8 | 13386.147 | 11.63 | | | 71.67 |
| 9 | 86.704 | 5.89 | 1.89286 | 20.4 | 68.81 |
| 10 | 159.733 | 33.10 | | | 67.66 |
| 11 | 69.154 | 2.30 | 1.65412 | 39.7 | 49.89 |
| 12 | 45.945 | 1.53 | | | 47.30 |
| 13 | 55.402 | 8.24 | 1.66672 | 48.3 | 47.22 |
| 14 | 2426.623 | 3.00 | | | 45.60 |
| 15 (APERTURE) | ∞ | 2.00 | | | 42.92 |
| 16 | 174.740 | 2.00 | 1.90366 | 31.3 | 40.00 |
| 17 | 37.347 | 4.13 | 1.49700 | 81.5 | 36.73 |
| 18 | 52.890 | 15.51 | | | 35.68 |
| 19 | 87.342 | 4.14 | 1.84666 | 23.8 | 31.49 |
| 20 | 403.419 | 1.07 | | | 31.05 |
| 21 | 95.943 | 4.24 | 1.85478 | 24.8 | 32.55 |
| 22 | −94.709 | 1.50 | 1.76385 | 48.5 | 32.10 |
| 23 | 38.328 | 6.23 | | | 30.47 |
| 24 | −80.394 | 1.50 | 1.76385 | 48.5 | 30.84 |
| 25 | 109.369 | 3.26 | | | 32.09 |
| 26 | 72.385 | 12.53 | 1.67300 | 38.1 | 34.59 |
| 27 | −32.147 | 1.70 | 1.59522 | 67.7 | 35.84 |
| 28 | −300.120 | 0.15 | | | 37.16 |
| 29 | 144.097 | 9.42 | 1.85478 | 24.8 | 37.64 |
| 30 | −34.206 | 2.00 | 1.89286 | 20.4 | 37.67 |
| 31 | 1892.910 | 0.16 | | | 37.94 |
| 32 | ∞ | 2.20 | 1.51633 | 64.1 | 40.00 |
| 33 | ∞ | 61.34 | | | 40.00 |

| | |
|---|---|
| IMAGE PLANE | ∞ |
| FOCAL LENGTH | 392.56 |
| F-NUMBER | 2.90 |
| HALF FIELD ANGLE | 3.15 |
| IMAGE HEIGHT | 21.64 |
| TOTAL LENS LENGTH | 371.98 |
| BF | 61.34 |
| POSITION OF ENTRANCE PUPIL | 626.88 |
| POSITION OF EXIT PUPIL | −65.09 |
| FRONT PRINCIPAL POINT POSITION | −199.43 |
| REAR PRINCIPAL POINT POSITION | −331.22 |

DATA OF SINGLE LENS

| LENS | STARTING SURFACE | FOCAL LENGTH |
|---|---|---|
| 1 | 1 | 343.67 |
| 2 | 3 | 162.13 |
| 3 | 5 | −63.96 |
| 4 | 7 | 170.85 |
| 5 | 9 | 204.61 |
| 6 | 11 | −217.83 |
| 7 | 13 | 84.92 |
| 8 | 16 | −52.93 |
| 9 | 17 | 234.98 |
| 10 | 19 | 130.88 |
| 11 | 21 | 56.34 |
| 12 | 22 | −35.55 |
| 13 | 24 | −60.45 |
| 14 | 26 | 34.75 |
| 15 | 27 | −60.63 |
| 16 | 29 | 33.15 |
| 17 | 30 | −37.61 |

Fourth Numerical Embodiment

UNIT mm
SURFACE DATA

| SURFACE NUMBER | r | d | nd | vd | EFFECTIVE DIAMETER |
|---|---|---|---|---|---|
| 1 | 163.339 | 13.35 | 1.59270 | 35.3 | 120.06 |
| 2 | 943.811 | 144.80 | | | 118.94 |
| 3 | 104.653 | 12.00 | 1.43387 | 95.1 | 61.40 |
| 4 | −116.617 | 0.15 | | | 59.82 |
| 5 | −117.086 | 2.30 | 1.85478 | 24.8 | 59.62 |
| 6 | 80.844 | 0.15 | | | 57.15 |
| 7 | 77.117 | 12.13 | 1.43387 | 95.1 | 57.26 |
| 8 | −114.243 | 0.15 | | | 57.03 |
| 9 | 95.689 | 3.57 | 1.89286 | 20.4 | 54.37 |
| 10 | 129.498 | 4.81 | | | 53.26 |
| 11 | −174.822 | 2.00 | 1.48749 | 70.2 | 53.26 |
| 12 | 146.631 | 43.95 | | | 51.87 |
| 13 | 107.088 | 10.02 | 1.64769 | 33.8 | 49.80 |
| 14 | −72.534 | 2.20 | 1.58913 | 61.1 | 49.14 |
| 15 | −4440.551 | 2.95 | | | 47.39 |
| 16 (APERTURE) | ∞ | 8.01 | | | 40.94 |
| 17 | 702.560 | 1.90 | 1.84666 | 23.8 | 36.97 |
| 18 | 47.597 | 7.46 | 1.61340 | 44.3 | 35.58 |
| 19 | −126.474 | 19.15 | | | 35.02 |
| 20 | 122.013 | 3.76 | 1.84666 | 23.8 | 26.80 |
| 21 | −71.635 | 1.40 | 1.76385 | 48.5 | 26.39 |
| 22 | 34.538 | 6.95 | | | 25.37 |
| 23 | −64.820 | 1.40 | 1.76385 | 48.5 | 26.15 |
| 24 | 90.115 | 2.28 | | | 27.35 |
| 25 | 139.671 | 9.08 | 1.73800 | 32.3 | 29.11 |
| 26 | −21.978 | 1.70 | 1.76385 | 48.5 | 30.01 |
| 27 | −232.122 | 0.96 | | | 32.79 |
| 28 | 78.499 | 8.15 | 1.73800 | 32.3 | 34.89 |
| 29 | −47.550 | 1.90 | 1.89286 | 20.4 | 35.24 |
| 30 | −127.714 | 9.43 | | | 35.96 |
| 31 | ∞ | 2.20 | 1.51633 | 64.1 | 40.00 |
| 32 | ∞ | 71.62 | | | 40.00 |

| | |
|---|---|
| IMAGE PLANE | ∞ |
| FOCAL LENGTH | 488.82 |
| F-NUMBER | 4.10 |
| HALF FIELD ANGLE | 2.53 |
| IMAGE HEIGHT | 21.64 |
| TOTAL LENS LENGTH | 411.90 |
| BF | 71.62 |
| POSITION OF ENTRANCE PUPIL | 760.74 |
| POSITION OF EXIT PUPIL | −81.18 |
| FRONT PRINCIPAL POINT POSITION | −314.21 |
| REAR PRINCIPAL POINT POSITION | −417.20 |

DATA OF SINGLE LENS

| LENS | STARTING SURFACE | FOCAL LENGTH |
|---|---|---|
| 1 | 1 | 331.15 |
| 2 | 3 | 129.25 |
| 3 | 5 | −55.65 |
| 4 | 7 | 108.19 |
| 5 | 9 | 391.00 |
| 6 | 11 | −163.25 |
| 7 | 13 | 68.26 |
| 8 | 14 | −125.19 |
| 9 | 17 | −60.38 |
| 10 | 18 | 57.31 |
| 11 | 20 | 53.79 |
| 12 | 21 | −30.33 |
| 13 | 23 | −49.16 |
| 14 | 25 | 26.36 |
| 15 | 26 | −31.89 |
| 16 | 28 | 41.26 |
| 17 | 29 | −85.80 |

Fifth Numerical Embodiment

UNIT mm
SURFACE DATA

| SURFACE NUMBER | r | d | nd | vd | EFFECTIVE DIAMETER |
|---|---|---|---|---|---|
| 1 | 168.552 | 14.91 | 1.59270 | 35.3 | 133.65 |
| 2 | 853.592 | 122.18 | | | 132.49 |
| 3 | 148.612 | 11.95 | 1.43387 | 95.1 | 81.00 |
| 4 | −254.303 | 0.15 | | | 79.55 |
| 5 | −257.480 | 3.20 | 1.85478 | 24.8 | 79.38 |
| 6 | 141.530 | 0.15 | | | 76.27 |
| 7 | 127.364 | 12.78 | 1.43387 | 95.1 | 76.25 |
| 8 | −174.232 | 0.15 | | | 75.68 |
| 9 | 577.170 | 3.41 | 1.89286 | 20.4 | 72.87 |
| 10 | 4707.875 | 3.60 | | | 72.09 |
| 11 | −190.967 | 3.00 | 1.80400 | 46.6 | 72.07 |
| 12 | 1388.400 | 88.70 | | | 71.03 |
| 13 | 145.654 | 7.22 | 1.59551 | 39.2 | 58.51 |
| 14 | −226.906 | 2.80 | 1.67790 | 55.3 | 57.84 |
| 15 | 984.208 | 3.28 | | | 56.57 |
| 16 (APERTURE) | ∞ | 63.32 | | | 45.47 |
| 17 | −414.599 | 1.20 | 1.76385 | 48.5 | 20.91 |
| 18 | 29.784 | 4.80 | 1.54814 | 45.8 | 20.45 |
| 19 | −119.234 | 2.00 | | | 20.87 |
| 20 | 99.170 | 3.22 | 1.78472 | 25.7 | 25.23 |
| 21 | −62.702 | 1.30 | 1.76385 | 48.5 | 25.08 |
| 22 | 48.094 | 3.54 | | | 24.53 |
| 23 | −80.964 | 1.30 | 1.76385 | 48.5 | 24.69 |
| 24 | 140.808 | 1.27 | | | 25.34 |
| 25 | 57.182 | 13.30 | 1.67300 | 38.1 | 24.00 |
| 26 | −35.514 | 1.30 | 1.59522 | 67.7 | 25.49 |
| 27 | 74.378 | 17.60 | | | 26.08 |
| 28 | 112.883 | 7.02 | 1.65412 | 39.7 | 33.62 |
| 29 | −43.326 | 1.70 | 1.89286 | 20.4 | 33.92 |
| 30 | −99.977 | 11.95 | | | 34.71 |
| 31 | ∞ | 2.20 | 1.51633 | 64.1 | 40.00 |
| 32 | ∞ | 71.54 | | | 40.00 |

| IMAGE PLANE | ∞ |
|---|---|
| FOCAL LENGTH | 778.70 |
| F-NUMBER | 5.83 |
| HALF FIELD ANGLE | 1.59 |
| IMAGE HEIGHT | 21.64 |
| TOTAL LENS LENGTH | 486.03 |
| BF | 71.54 |
| POSITION OF ENTRANCE PUPIL | 834.02 |
| POSITION OF EXIT PUPIL | −145.46 |
| FRONT PRINCIPAL POINT POSITION | −1181.64 |
| REAR PRINCIPAL POINT POSITION | −707.16 |

DATA OF SINGLE LENS

| LENS | STARTING SURFACE | FOCAL LENGTH |
|---|---|---|
| 1 | 1 | 351.50 |
| 2 | 3 | 218.15 |
| 3 | 5 | −106.45 |
| 4 | 7 | 171.79 |
| 5 | 9 | 736.46 |
| 6 | 11 | −208.62 |
| 7 | 13 | 150.05 |
| 8 | 14 | −271.75 |
| 9 | 17 | −36.34 |
| 10 | 18 | 43.98 |
| 11 | 20 | 49.38 |
| 12 | 21 | −35.45 |
| 13 | 23 | −67.13 |
| 14 | 25 | 34.55 |
| 15 | 26 | −40.21 |
| 16 | 28 | 48.73 |
| 17 | 29 | −86.87 |

TABLE

| | | First Exemplary Embodiment | Second Exemplary Embodiment | Third Exemplary Embodiment | Fourth Exemplary Embodiment | Fifth Exemplary Embodiment |
|---|---|---|---|---|---|---|
| | f | 392.55 | 292.46 | 392.56 | 488.82 | 778.7 |
| | F-number | 2.9 | 2.9 | 2.9 | 4.1 | 5.8 |
| | LD | 371.25 | 273.23 | 371.23 | 411.15 | 485.28 |
| (8) | $\tau 1$ | $0.2 \times 10^{-6}$ | $0.2 \times 10^{-6}$ | $0.2 \times 10^{-6}$ | $0.2 \times 10^{-6}$ | $0.2 \times 10^{-6}$ |
| | $\theta gFi$ | 0.5933 | 0.5933 | 0.5933 | 0.5933 | 0.5933 |
| | f1 | 316.96 | 211.24 | 343.67 | 331.15 | 351.50 |
| (4) | $\tau n$ | $4.3 \times 10^{-6}$ | $4.3 \times 10^{-6}$ | $4.3 \times 10^{-6}$ | $4.3 \times 10^{-6}$ | $4.3 \times 10^{-6}$ |
| | Ndn | 1.85478 | 1.85478 | 1.85478 | 1.85478 | 1.85478 |
| (5) | $vdn$ | 24.8 | 24.8 | 24.8 | 24.8 | 24.8 |
| | $\theta gFn$ | 0.6122 | 0.6122 | 0.6122 | 0.6122 | 0.6122 |
| | fn | −79.86 | −45.53 | −63.96 | −55.65 | −106.45 |
| | D1p | 100.00 | 64.58 | 124.89 | 144.80 | 122.18 |
| (2) | $\tau p$ | $-1.06 \times 10^{-5}$ | $-1.06 \times 10^{-5}$ | $-1.06 \times 10^{-5}$ | $-1.06 \times 10^{-5}$ | $-1.06 \times 10^{-5}$ |
| (1) | $vdp$ | 95.1 | 95.1 | 95.1 | 95.1 | 95.1 |
| | $\theta gFp$ | 0.5373 | 0.5373 | 0.5373 | 0.5373 | 0.5373 |
| | fp | 188.88 | 127.46 | 162.13 | 129.25 | 218.15 |
| | $\Delta\theta gFi$ | 0.0089 | 0.0089 | 0.0089 | 0.0089 | 0.0089 |
| (9) | $|f1/f|$ | 0.807 | 0.722 | 0.875 | 0.677 | 0.451 |
| | $\Delta\theta gFn$ | 0.0101 | 0.0101 | 0.0101 | 0.0101 | 0.0101 |
| (10) | D1p/LD | 0.269 | 0.236 | 0.336 | 0.352 | 0.252 |
| | $\Delta\theta gFp$ | 0.0534 | 0.0534 | 0.0534 | 0.0534 | 0.0534 |
| (3) | fp/f | 0.481 | 0.436 | 0.413 | 0.264 | 0.280 |
| (6) | $-fn/f$ | 0.203 | 0.156 | 0.163 | 0.114 | 0.137 |
| (7) | $\tau p2$ | $-1.06 \times 10^{-5}$ | $-1.06 \times 10^{-5}$ | $-1.06 \times 10^{-5}$ | $-1.06 \times 10^{-5}$ | $-1.06 \times 10^{-5}$ |

Referring to FIG. 14, an exemplary embodiment of a digital still camera (an image pickup apparatus) using the optical system of the present disclosure as an image pickup optical system will be described next. In FIG. 14, reference numeral 10 is a camera main body, and reference numeral 11 is an image pickup optical system constituted by either one of the optical systems described in the first to fifth exemplary embodiment. Reference numeral 12 is a solid state image pickup element (a photo electric transducer), such as a CCD sensor or a CMOS sensor, that is built-in inside the camera main body and that photo receives an object image formed by the image pickup optical system 11.

While the present invention has been described with reference to exemplary embodiments, it is to be understood that the invention is not limited to the disclosed exemplary embodiments.

This application claims the benefit of Japanese Patent Application No. 2016-109654 filed Jun. 1, 2016, which is hereby incorporated by reference herein in its entirety.

What is claimed is:

1. A lens apparatus, comprising:
an optical system including a lens G1 disposed closest to an object side of the optical system, a positive lens Gp disposed on an image side of the lens G1, and a negative lens Gn disposed adjacent to the positive lens Gp;
a holding member arranged to hold the positive lens Gp and the negative lens Gn; and
an exterior member arranged to engage with the holding member and to accommodate the holding member,
wherein the positive lens Gp is arranged closest to the object side among every lens made of a material having negative temperature coefficient of refractive index disposed on the image side of the lens G1,
wherein the holding member and the exterior member are disposed so as to be separated from each other with an air gap between in a region between a first plane and a second plane, the first plane being a plane that passes through a point on the object side surface of the positive lens Gp, positioned closest to the object side, and that is perpendicular to the optical axis of the optical system, and a second plane being a plane that passes through a point on the image side surface of the positive lens Gp, positioned closest to the image side, and that is perpendicular to the optical axis of the optical system,
wherein the holding member and the exterior member are disposed so as to be separated from each other with an air gap in between in a region between a third plane and a fourth plane, the third plane being a plane that passes through a point on the object side surface of the negative lens Gn, positioned closest to the object side, and that is perpendicular to the optical axis of the optical system, and the fourth plane being a plane that passes through a point on the image side surface of the negative lens Gn, positioned closest to the image side, and that is perpendicular to the optical axis of the optical system, and
wherein the holding member and the exterior member are in contact with each other in a first contact region between the lens G1 and the positive lens Gp.

2. The lens apparatus according to claim 1, wherein a conditional expression $$0.15 < fp/f < 0.60$$

is satisfied, where fp is a focal length of the positive lens Gp, and f is a focal length of the optical system.

3. The lens apparatus according to claim 1, wherein a maximum width of the air gap between the holding member and the exterior member in the region between the first plane and the second plane is smaller than 0.2×EDp, where EDp is an effective diameter of the lens surface of the positive lens Gp on the object side.

4. The lens apparatus according to claim 1, wherein the negative lens Gn is disposed on the image side of the positive lens Gp.

5. The lens apparatus according to claim 4, wherein the temperature coefficient of refractive index of the material of the negative lens Gn is a positive value.

6. The lens apparatus according to claim 1, wherein a maximum width of the air gap between the holding member and the exterior member in the region between the first plane and the fourth plane is smaller than 0.2×EDn, where EDn is an effective diameter of the lens surface of the negative lens Gn on the object side.

7. The lens apparatus according to claim 1, wherein a conditional expression $$20.0 < vdn < 45.0$$

is satisfied, where vdn is an Abbe constant of the material of the negative lens Gn.

8. The lens apparatus according to claim 1, wherein a conditional expression $$0.07 < -fn/f < 0.30$$

is satisfied, where fn is a focal length of the negative lens Gn, and f is the focal length of the optical system.

9. The lens apparatus according to claim 1, wherein a further positive lens Gp2 is disposed on the image side of the positive lens Gp, and the temperature coefficient of refractive index of a material of the further positive lens Gp2 is a negative value.

10. The lens apparatus according to claim 9, wherein the holding member and the exterior member are disposed so as to be separated from each other with an air gap in between in a region between a fifth plane and a sixth plane, the fifth plane being a plane that passes through a point on the object side surface of the further positive lens Gp2, positioned closest to the object side, and that is perpendicular to the optical axis of the optical system, and the sixth plane being a plane that passes through a point on the image side surface of the further positive lens Gp2, positioned closest to the image side, and that is perpendicular to the optical axis of the optical system.

11. The lens apparatus according to claim 10, wherein a maximum width of the air gap between the holding member and the exterior member in the region between the first plane and the sixth plane is smaller than 0.2×EDp2, where EDp2 is an effective diameter of the lens surface of the further positive lens Gp2 on the object side of the further positive lens Gp2.

12. The lens apparatus according to claim 1, wherein a conditional expression $$-1.0 \times 10^{-6} < \tau 1 < 1.0 \times 10^{-6}$$

is satisfied, where τ1 is a temperature coefficient of refractive index of the material of the lens G1.

13. The lens apparatus according to claim 1, wherein a conditional expression $$0.30 < |f1/f| < 1.00$$

is satisfied, where f1 is a focal length of the lens G1, and f is the focal length of the optical system.

14. The lens apparatus according to claim 1,
wherein a conditional expression $$0.17 < D1p/LD < 0.50 \qquad (5)$$

is satisfied, where D1$p$ is a distance along the optical axis between the lens G1 and the positive lens Gp, and LD is a distance along the optical axis from a lens surface closest to the object side of the optical system to an image plane.

15. The lens apparatus according to claim 1,
wherein the holding member and the exterior member are in contact with each other in a second contact region on the image side with respect to the second plane.

16. The lens apparatus according to claim 15,
wherein a distance between the first contact region and the first plane in an optical axis direction is larger than a distance between the second contact region and the second plane in the optical axis direction.

17. An image pickup apparatus comprising:
a lens apparatus; and
an image pickup element,
wherein the lens apparatus includes
an optical system including a lens G1 disposed closest to an object side of the optical system, a positive lens Gp disposed on an image side of the lens G1, and a negative lens Gn disposed adjacent to the positive lens Gp,
a holding member arranged to hold the positive lens Gp and the negative lens Gn, and
an exterior member arranged to engage with the holding member and to accommodate the holding member,
wherein the positive lens Gp is arranged closest to the object side among every lens made of a material having negative temperature coefficient of refractive index disposed on the image side of the lens G1,
wherein the holding member and the exterior member are disposed so as to be separated from each other with an air gap in between in a region between a first plane and a second plane, the first plane being a plane that passes through a point on the object side surface of the positive lens Gp, positioned closest to the object side, and that is perpendicular to the optical axis of the optical system, and the second plane being a plane that passes through a point on the image side surface of the positive lens Gp, positioned closest to the image side, and that is perpendicular to the optical axis of the optical system,
wherein the holding member and the exterior member are disposed so as to be separated from each other with an air gap in between in a region between a third plane and a fourth plane, the third plane being a plane that passes through a point on the object side surface of the negative lens Gn, positioned closest to the object side, and that is perpendicular to the optical axis of the optical system, and the fourth plane being a plane that passes through a point on the image side surface of the negative lens Gn, positioned closest to the image side, and that is perpendicular to the optical axis of the optical system, and
wherein the holding member and the exterior member are in contact with each other in a first contact region between the lens G1 and the positive lens Gp.

* * * * *